(12) United States Patent  
Terashima

(10) Patent No.: US 8,378,581 B2  
(45) Date of Patent: *Feb. 19, 2013

(54) DISCHARGE LAMP LIGHTING DEVICE, PROJECTOR, AND DRIVING METHOD OF DISCHARGE LAMP

(75) Inventor: Tetsuo Terashima, Chino (JP)

(73) Assignee: Seiko Epson Corporation, Tokyo (JP)

( * ) Notice: Subject to any disclaimer, the term of this patent is extended or adjusted under 35 U.S.C. 154(b) by 333 days.

This patent is subject to a terminal disclaimer.

(21) Appl. No.: 12/832,166

(22) Filed: Jul. 8, 2010

(65) Prior Publication Data

US 2011/0018456 A1    Jan. 27, 2011

(30) Foreign Application Priority Data

Jul. 23, 2009 (JP) ................................ 2009-172055

(51) Int. Cl.
 *H05B 37/00* (2006.01)
(52) U.S. Cl. ......................... 315/246; 315/307; 315/308
(58) Field of Classification Search .................. 315/209, 315/224, 246, 287, 289, 291, 307, 308
See application file for complete search history.

(56) References Cited

U.S. PATENT DOCUMENTS

| 4,912,374 | A  | * | 3/1990 | Nagase et al. ................ 315/244 |
| 7,023,144 | B2 |   | 4/2006 | Suzuki et al. |
| 7,170,237 | B2 |   | 1/2007 | Suzuki et al. |
| 8,203,280 | B2 | * | 6/2012 | Yamauchi et al. ............ 315/291 |
| 2008/0116820 | A1 | * | 5/2008 | Ozasa et al. .................. 315/246 |
| 2010/0128232 | A1 | * | 5/2010 | Kagata et al. ................... 353/85 |

FOREIGN PATENT DOCUMENTS

| JP | 1-112698 A | 5/1989 |
| JP | 1-217893 A | 8/1989 |
| JP | 2003-059684 A | 2/2003 |
| JP | 2006-059790 A | 3/2006 |
| JP | 2006-332015 A | 12/2006 |

* cited by examiner

*Primary Examiner* — Douglas W Owens  
*Assistant Examiner* — Amy Yang  
(74) *Attorney, Agent, or Firm* — AdvantEdge Law Group, LLC

(57) ABSTRACT

In at least one embodiment of the disclosure, a discharge lamp lighting device comprises a discharge lamp driving section and a control unit. The control unit alternately performs a first DC driving processing and a first AC driving processing in a first section of the driving current. The control unit alternately performs a second DC driving processing and a second AC driving processing in a second section of the driving current different from the first section. The control unit temporally changes a length of at least one of: (i) a period for which the first DC driving processing is performed, and (ii) a period for which the second DC driving processing is performed.

13 Claims, 11 Drawing Sheets

FIRST POLARITY STATE P1

SECOND POLARITY STATE P2

DISCHARGE LAMP LIGHTING DEVICE, PROJECTOR, AND DRIVING METHOD OF DISCHARGE LAMP

CROSS-REFERENCE

The present application claims priority from Japanese Patent Application No. 2009-172055 filed on Jul. 23, 2009 which is hereby incorporated by reference in its entirety.

BACKGROUND

Discharge lamps, such as high-pressure mercury lamps or metal halide lamps, have been used as light sources of a projector. In these discharge lamps, the shape of an electrode changes due to a drop in fusibility resulting from consumption of the electrode by discharge or progress of crystallization of the electrode according to an increase in cumulative lighting time. In addition, when a plurality of projections grow in an electrode tip portion or irregular consumption of the electrode body progresses by those described above, the arc origin moves or the arc length changes. Such phenomena are not desirable because they reduce the brightness of a discharge lamp so that the lifespan of the discharge lamp is reduced.

In order to solve the problem, a discharge lamp lighting device that drives a discharge lamp using alternating currents with different frequencies is known (see, e.g., JP-A-2006-59790). In addition, a discharge lamp lighting device that supplies a driving current, in which a direct current is intermittently inserted in a high-frequency alternating current, to a discharge lamp is known (see, e.g., JP-A-1-112698).

However, even if a discharge lamp is driven simply by using alternating currents with different frequencies as disclosed in JP-A-2006-59790 or a driving current in which a direct current is intermittently inserted in an alternating current with a high frequency is simply supplied to a discharge lamp as disclosed in JP-A-1-112698, steady convection caused by light emission is formed within the discharge lamp. As a result, unbalanced consumption of an electrode or unbalanced precipitation of an electrode material may occur, or an electrode material may evaporate excessively to cause blackening, which is a phenomenon in which an electrode material adheres to an inner wall of a sealed body.

SUMMARY

Various embodiments of the disclosure provide a discharge lamp lighting device capable of preventing unbalanced consumption of an electrode or unbalanced precipitation of an electrode material by suppressing the formation of steady convection in a discharge lamp, preventing blackening, which is a phenomenon in which an electrode material adheres to an inner wall of a sealed body, by suppressing excessive melting of an electrode tip portion, and maintaining a projection of an electrode tip satisfactorily and provides a control method of a discharge lamp lighting device, and a projector.

According to an aspect of the disclosure, there is provided a discharge lamp lighting device including: a discharge lamp driving section that supplies a driving current to a discharge lamp to drive the discharge lamp; and a control unit that controls the discharge lamp driving section. The control unit performs first DC driving processing and first AC driving processing alternately in a first section. The control unit performs second DC driving processing and second AC driving processing alternately in a second section different from the first section. The control unit performs control of supplying a first direct current, which starts from a first polarity and has a first polarity component, as the driving current in the first DC driving processing. The control unit performs control of supplying a first alternating current, which repeats a first polarity component and a second polarity component, as the driving current in the first AC driving processing. The control unit performs control of supplying a second direct current, which starts from a second polarity and has a second polarity component, as the driving current in the second DC driving processing. The control unit performs control of supplying a second alternating current, which repeats a first polarity component and a second polarity component, as the driving current in the second AC driving processing. The control unit temporally changes the length of at least one of a period, for which the first DC driving processing is performed, and a period, for which the second DC driving processing is performed.

The first direct current may be a current pulse having a first polarity component multiple times, and the second direct current may be a current pulse having a second polarity component multiple times.

According to the discharge lamp lighting device, since the length of at least one of the period for which the first DC driving processing is performed and the period for which the second DC driving processing is performed is temporally changed, a temperature difference (for example, several tens to hundreds of centigrade) occurs between both electrodes of the discharge lamp. As a result, since the formation of steady convection in the discharge lamp is suppressed, it is possible to prevent unbalanced consumption of an electrode or unbalanced precipitation of an electrode material. In addition, since excessive melting of an electrode tip portion is suppressed, it is possible to prevent blackening, which is a phenomenon in which an electrode material adheres to an inner wall of a sealed body, and to maintain a projection of the electrode tip satisfactorily.

In the discharge lamp lighting device described above, the control unit may temporally change the length of at least one of the period, for which the first DC driving processing is performed, and the period, for which the second DC driving processing is performed, so as to repeat increase and decrease.

According to the discharge lamp lighting device, the length of at least one of the period for which the first DC driving processing is performed and the period for which the second DC driving processing is performed is temporally changed to repeat increase and decrease. Accordingly, since the formation of steady convection in the discharge lamp is suppressed, it is possible to prevent unbalanced consumption of an electrode or unbalanced precipitation of an electrode material. In addition, since excessive melting of an electrode tip portion is suppressed, it is possible to prevent blackening, which is a phenomenon in which an electrode material adheres to an inner wall of a sealed body, and to maintain a projection of the electrode tip satisfactorily.

In the discharge lamp lighting device described above, the control unit may temporally change the length of at least one of the period, for which the first DC driving processing is performed, and the period, for which the second DC driving processing is performed, so as to repeat increase and decrease in a stepwise manner.

According to the discharge lamp lighting device, the length of at least one of the period for which the first DC driving processing is performed and the period for which the second DC driving processing is performed is temporally changed to repeat increase and decrease in a stepwise manner. Accordingly, since the formation of steady convection in the discharge lamp is further suppressed, it is possible to prevent unbalanced consumption of an electrode or unbalanced precipitation of an electrode material. In addition, since excessive melting of an electrode tip portion is suppressed, it is possible to prevent blackening, which is a phenomenon in which an electrode material adheres to an inner wall of a sealed body, and to maintain a projection of the electrode tip satisfactorily.

In the discharge lamp lighting device described above, the control unit may temporally change the length of at least one of the period, for which the first AC driving processing is performed, and the period, for which the second AC driving processing is performed.

According to the discharge lamp lighting device, the length of at least one of the period for which the first AC driving processing is performed and the period for which the second AC driving processing is performed is temporally changed. Accordingly, since the formation of steady convection in the discharge lamp is further suppressed, it is possible to prevent unbalanced consumption of an electrode or unbalanced precipitation of an electrode material. In addition, since excessive melting of an electrode tip portion is suppressed, it is possible to prevent blackening, which is a phenomenon in which an electrode material adheres to an inner wall of a sealed body, and to maintain a projection of the electrode tip satisfactorily.

According to another aspect of the disclosure, there is provided a discharge lamp lighting device including: a discharge lamp driving section that supplies a driving current to a discharge lamp to drive the discharge lamp; and a control unit that controls the discharge lamp driving section. The control unit performs first DC driving processing and first AC driving processing alternately in a first section. The control unit performs second DC driving processing and second AC driving processing alternately in a second section different from the first section. The control unit performs control of supplying a first direct current, which starts from a first polarity and has a first polarity component, as the driving current in the first DC driving processing. The control unit performs control of supplying a first alternating current, which repeats a first polarity component and a second polarity component, as the driving current in the first AC driving processing. The control unit performs control of supplying a second direct current, which starts from a second polarity and has a second polarity component, as the driving current in the second DC driving processing. The control unit performs control of supplying a second alternating current, which repeats a first polarity component and a second polarity component, as the driving current in the second AC driving processing. The control unit temporally changes the length of at least one of a period, for which the first AC driving processing is performed, and a period, for which the second AC driving processing is performed.

According to the discharge lamp lighting device, the length of at least one of the period for which the first AC driving processing is performed and the period for which the second AC driving processing is performed is temporally changed. Accordingly, since the formation of steady convection in the discharge lamp is suppressed, it is possible to prevent unbalanced consumption of an electrode or unbalanced precipitation of an electrode material. In addition, since excessive melting of an electrode tip portion is suppressed, it is possible to prevent blackening, which is a phenomenon in which an electrode material adheres to an inner wall of a sealed body, and to maintain a projection of the electrode tip satisfactorily.

In the discharge lamp lighting device described above, the control unit may temporally change the length of at least one of the period, for which the first AC driving processing is performed, and the period, for which the second AC driving processing is performed, so as to repeat increase and decrease.

According to the discharge lamp lighting device, the length of at least one of the period for which the first AC driving processing is performed and the period for which the second AC driving processing is performed is temporally changed to repeat increase and decrease. Accordingly, since the formation of steady convection in the discharge lamp is suppressed, it is possible to prevent unbalanced consumption of an electrode or unbalanced precipitation of an electrode material. In addition, since excessive melting of an electrode tip portion is suppressed, it is possible to prevent blackening, which is a phenomenon in which an electrode material adheres to an inner wall of a sealed body, and to maintain a projection of the electrode tip satisfactorily.

In the discharge lamp lighting device described above, the control unit may temporally change the length of at least one of the period, for which the first AC driving processing is performed, and the period, for which the second AC driving processing is performed, so as to repeat increase and decrease in a stepwise manner.

According to the discharge lamp lighting device, the length of at least one of the period for which the first AC driving processing is performed and the period for which the second AC driving processing is performed is temporally changed to repeat increase and decrease in a stepwise manner. Accordingly, since the formation of steady convection in the discharge lamp is further suppressed, it is possible to prevent unbalanced consumption of an electrode or unbalanced precipitation of an electrode material. In addition, since excessive melting of an electrode tip portion is suppressed, it is possible to prevent blackening, which is a phenomenon in which an electrode material adheres to an inner wall of a sealed body, and to maintain a projection of the electrode tip satisfactorily.

According to still another aspect of the disclosure, there is provided a projector including one of the discharge lamp lighting devices described above.

According to the projector, it is possible to prevent unbalanced consumption of an electrode or unbalanced precipitation of an electrode material by suppressing the formation of steady convection in a discharge lamp, to prevent blackening, which is a phenomenon in which an electrode material adheres to an inner wall of a sealed body, by suppressing excessive melting of an electrode tip portion, and to maintain a projection of an electrode tip satisfactorily.

According to yet another aspect of the disclosure, a driving method of a discharge lamp that lights by supply of a driving current to a discharge lamp includes: performing first DC driving and first AC driving alternately in a first section; performing second DC driving and second AC driving alternately in a second section different from the first section; supplying a first direct current, which starts from a first polarity and has a first polarity component, as the driving current in the first DC driving; supplying a first alternating current, which repeats a first polarity component and a second polarity component, as the driving current in the first AC driving; supplying a second direct current, which starts from a second polarity and has a second polarity component, as the driving current in the second DC driving; supplying a second alternating current, which repeats a first polarity component and a second polarity component, as the driving current in the second AC driving; and temporally changing the length of at least one of a period, for which the first DC driving is performed, and a period, for which the second DC driving is performed.

According to the driving method of a discharge lamp, since the length of at least one of the period for which the first DC driving processing is performed and the period for which the second DC driving processing is performed is temporally changed, a temperature difference (for example, several tens to hundreds of centigrade) occurs between both electrodes of the discharge lamp. As a result, since the formation of steady convection in the discharge lamp is suppressed, it is possible to prevent unbalanced consumption of an electrode or unbalanced precipitation of an electrode material. In addition, since excessive melting of an electrode tip portion is suppressed, it is possible to prevent blackening, which is a phenomenon in which an electrode material adheres to an inner wall of a sealed body, and to maintain a projection of the electrode tip satisfactorily.

According to still yet another aspect of the disclosure, a driving method of a discharge lamp that lights by supply of a driving current to a discharge lamp includes: performing first DC driving and first AC driving alternately in a first section; performing second DC driving and second AC driving alternately in a second section different from the first section; supplying a first direct current, which starts from a first polarity and has a first polarity component, as the driving current in the first DC driving; supplying a first alternating current, which repeats a first polarity component and a second polarity component, as the driving current in the first AC driving; supplying a second direct current, which starts from a second polarity and has a second polarity component, as the driving current in the second DC driving; supplying a second alternating current, which repeats a first polarity component and a second polarity component, as the driving current in the second AC driving; and temporally changing the length of at least one of a period, for which the first AC driving is performed, and a period, for which the second AC driving is performed.

According to the discharge lamp lighting device, the length of at least one of the period for which the first AC driving processing is performed and the period for which the second AC driving processing is performed is temporally changed. Accordingly, since the formation of steady convection in the discharge lamp is suppressed, it is possible to prevent unbalanced consumption of an electrode or unbalanced precipitation of an electrode material. In addition, since excessive melting of an electrode tip portion is suppressed, it is possible to prevent blackening, which is a phenomenon in which an electrode material adheres to an inner wall of a sealed body, and to maintain a projection of the electrode tip satisfactorily.

BRIEF DESCRIPTION OF THE DRAWINGS

Non-limiting and non-exhaustive embodiments of the present disclosure will be described with reference to the accompanying drawings, wherein like numbers reference like elements.

DESCRIPTION OF EMBODIMENTS

In the following description, reference is made to the accompanying drawings which form a part hereof, and in which are shown, by way of illustration, specific embodiments in which the disclosure may be practiced. It is to be understood that other embodiments may be utilized and changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The appearances of the phrases "in one embodiment" or "in an embodiment" in various places in the specification do not necessarily all refer to the same embodiment, but it may.

Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment. Moreover, the scope of a disclosure under one section heading should not be construed to restrict or to limit the disclosure to that particular embodiment, rather the disclosure should indicate that a particular feature, structure, or characteristic described in connection with a section heading is included in at least one embodiment of the disclosure, but it may also be used in connection with other embodiments.

1. Optical System of Projector

Figure 1:
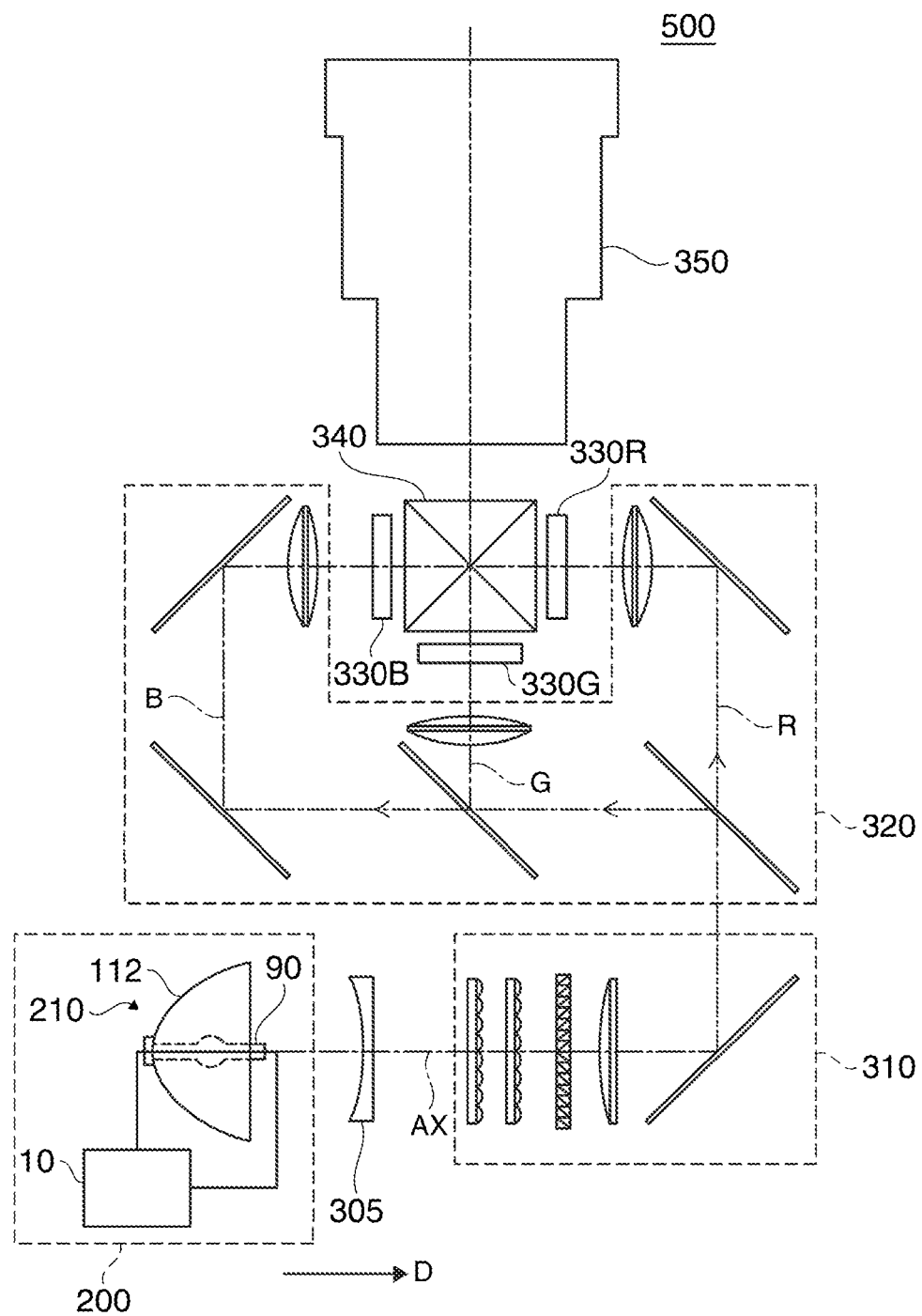
FIG. 1 is an explanatory view illustrating the configuration of a projector as an embodiment of the disclosure.

FIG. 1 is an explanatory view showing the configuration of a projector 500 as an embodiment of the disclosure. The projector 500 includes a light source device 200, a collimating lens 305, an illumination optical system 310, a color separation optical system 320, three liquid crystal light valves 330R, 330G, and 330B, a cross dichroic prism 340, and a projection optical system 350.

The light source device 200 has a light source unit 210 and a discharge lamp lighting device 10. The light source unit 210 has a main reflecting mirror 112, an auxiliary reflecting mirror 50 (FIG. 2), and a discharge lamp 90. The discharge lamp lighting device 10 supplies electric power to the discharge lamp 90 so that the discharge lamp 90 lights. The main reflecting mirror 112 reflects the light emitted from the discharge lamp 90 toward the irradiation direction D. The irradiation direction D is parallel to the optical axis AX. The light from the light source unit 210 passes through the collimating lens 305 and is then incident on the illumination optical system 310. The collimating lens 305 collimates the light from the light source unit 210.

The illumination optical system 310 equalizes the illuminance of the light from the light source device 200 in the liquid crystal light valves 330R, 330G, and 330B. In addition, the illumination optical system 310 aligns the polarization direction of the light from the light source device 200 in one direction. The reason is in order to use the light from the light source device 200 effectively in the liquid crystal light valves 330R, 330G, and 330B. The light whose illuminance distribution and polarization direction have been adjusted is incident on the color separation optical system 320. The color separation optical system 320 separates the incident light into three color light components of red (R), green (G), and blue (B). The three color light components are modulated by the liquid crystal light valves 330R, 330G, and 330B corresponding to the colors, respectively. The liquid crystal light valves 330R, 330G, and 330B include liquid crystal panels 560R, 560G, and 560B and polarizers disposed at the light incidence and emission sides of the liquid crystal panels 560R, 560G, and 560B, respectively. The three modulated color light components are mixed by the cross dichroic prism 340. The mixed light is incident on the projection optical system 350. The projection optical system 350 projects the incident light onto a screen (not shown). As a result, an image is displayed on the screen.

In addition, various known configurations may be adopted as the configurations of the collimating lens 305, the illumination optical system 310, the color separation optical system 320, the cross dichroic prism 340, and the projection optical system 350.

Figure 2:
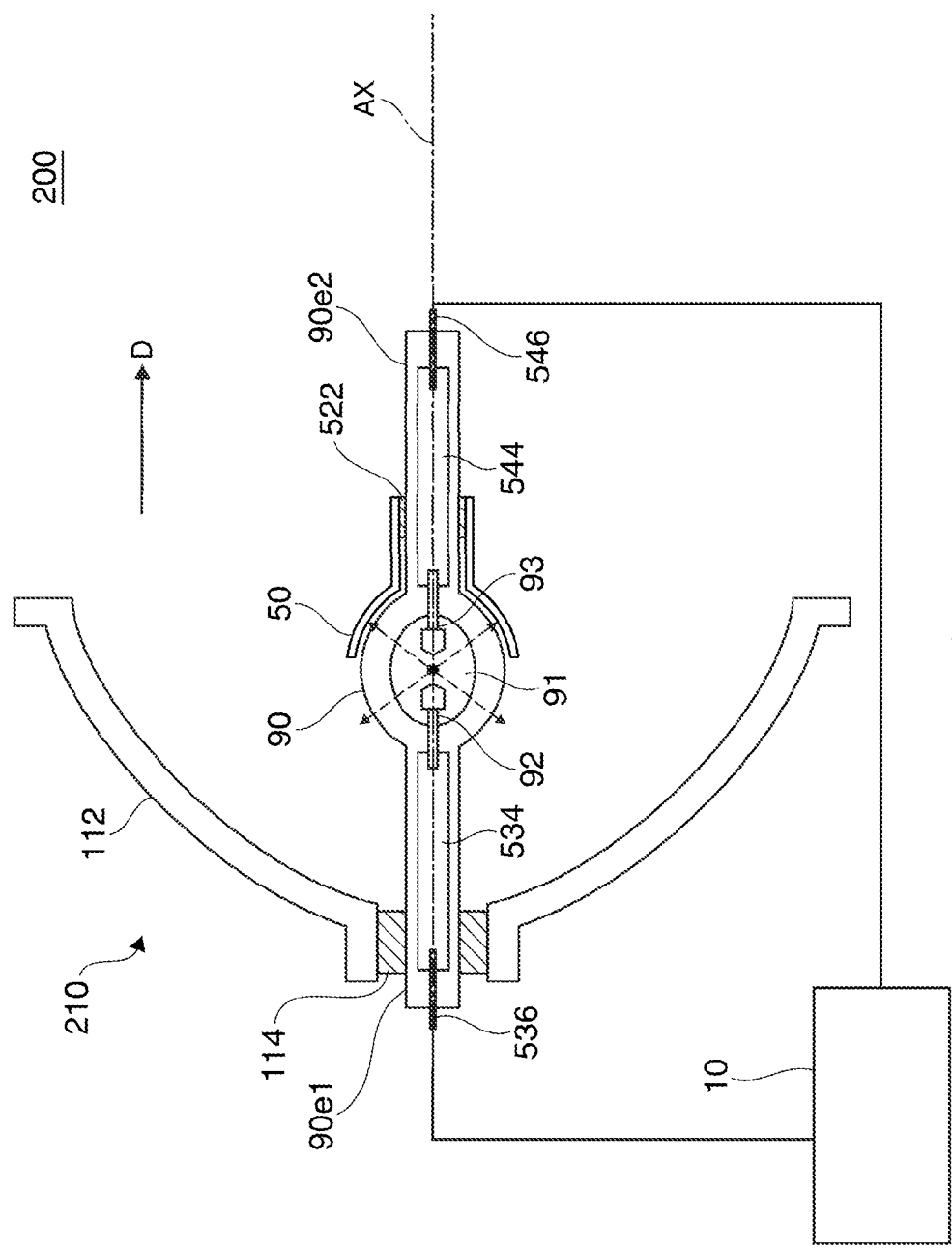
FIG. 2 is an explanatory view illustrates the configuration of a light source device.

FIG. 2 is an explanatory view showing the configuration of the light source device 200. The light source device 200 has the light source unit 210 and the discharge lamp lighting device 10. In FIG. 2, a sectional view of the light source unit 210 is shown. The light source unit 210 has the main reflecting mirror 112, the discharge lamp 90, and the auxiliary reflecting mirror 50.

The discharge lamp 90 has a rod shape which extends from a first end 90e1 to a second end 90e2 along the irradiation direction D. A material of the discharge lamp 90 is a translucent material, such as quartz glass. A middle portion of the discharge lamp 90 expands in the spherical shape, and a discharge space 91 is formed therein. Rare gas and gas, which is a discharge medium containing a metal halogen compound and the like, are injected into the discharge space 91.

Moreover, in the discharge space 91, two electrodes 92 and 93 protrude from the discharge lamp 90. The first electrode 92 is disposed at the first end 90e1 side of the discharge space 91, and the second electrode 93 is disposed at the second end 90e2 side of the discharge space 91. Each of the electrodes 92 and 93 has a rod shape extending along the optical axis AX. In the discharge space 91, tips (also called 'discharge ends') of the electrodes 92 and 93 face each other with a predetermined distance therebetween. In addition, the material of each of the electrodes 92 and 93 is metal, such as tungsten.

A first terminal 536 is provided at the first end 90e1 of the discharge lamp 90. The first terminal 536 and the first electrode 92 are electrically connected to each other by a conductive member 534 passing through the inside of the discharge lamp 90. Similarly, the second terminal 546 is provided at the second end 90e2 of the discharge lamp 90. The second terminal 546 and the second electrode 93 are electrically connected to each other by a conductive member 544 passing through the inside of the discharge lamp 90. The material of each of the terminals 536 and 546 is metal, such as tungsten. Moreover, for example, a molybdenum foil is used for the conductive members 534 and 544.

The terminals 536 and 546 are connected to the discharge lamp lighting device 10. The discharge lamp lighting device 10 supplies an alternate current to the terminals 536 and 546. As a result, arc discharge occurs between the two electrodes 92 and 93. The light (discharge light) generated by the arc discharge is emitted in all directions from the discharge position, as indicated by dotted arrows.

The main reflecting mirror 112 is fixed to the first end 90e1 of the discharge lamp 90 by a fixing member 114. The reflecting surface (surface facing the discharge lamp 90) of the main reflecting mirror 112 has a spheroidal shape. The main reflecting mirror 112 reflects the discharge light toward the irradiation direction D. In addition, the shape of the reflecting surface of the main reflecting mirror 112 is not limited to the spheroidal shape, and various shapes allowing the discharge light to be reflected toward the irradiation direction D may also be adopted. For example, the shape of a paraboloid of revolution may be adopted. In this case, the main reflecting mirror 112 can convert the discharge light into light which is almost parallel to the optical axis AX. Accordingly, the collimating lens 305 may not be provided.

The auxiliary reflecting mirror 50 is fixed to the second end 90e2 side of the discharge lamp 90 by a fixing member 522. The reflecting surface (surface facing the discharge lamp 90) of the auxiliary reflecting mirror 50 has a spherical shape surrounding the second end 90e2 side of the discharge space 91. The auxiliary reflecting mirror 50 reflects the discharge light toward the main reflecting mirror 112. Thus, the use efficiency of the light emitted from the discharge space 91 can be improved.

In addition, as the material of the fixing members 114 and 522, an arbitrary heat-resistant material (for example, an inorganic adhesive) which can stand the heat generation of the discharge lamp 90 may be adopted. In addition, the method of fixing the arrangement of the main reflecting mirror 112, the auxiliary reflecting mirror 50, and the discharge lamp 90 is not limited to the method of fixing the main reflecting mirror 112 and the auxiliary reflecting mirror 50 to the discharge lamp 90, and an arbitrary method may be adopted. For example, the discharge lamp 90 and the main reflecting mirror 112 may be fixed independently in a housing (not shown) of a projector. The same is true for the auxiliary reflecting mirror 50.

Figure 3:
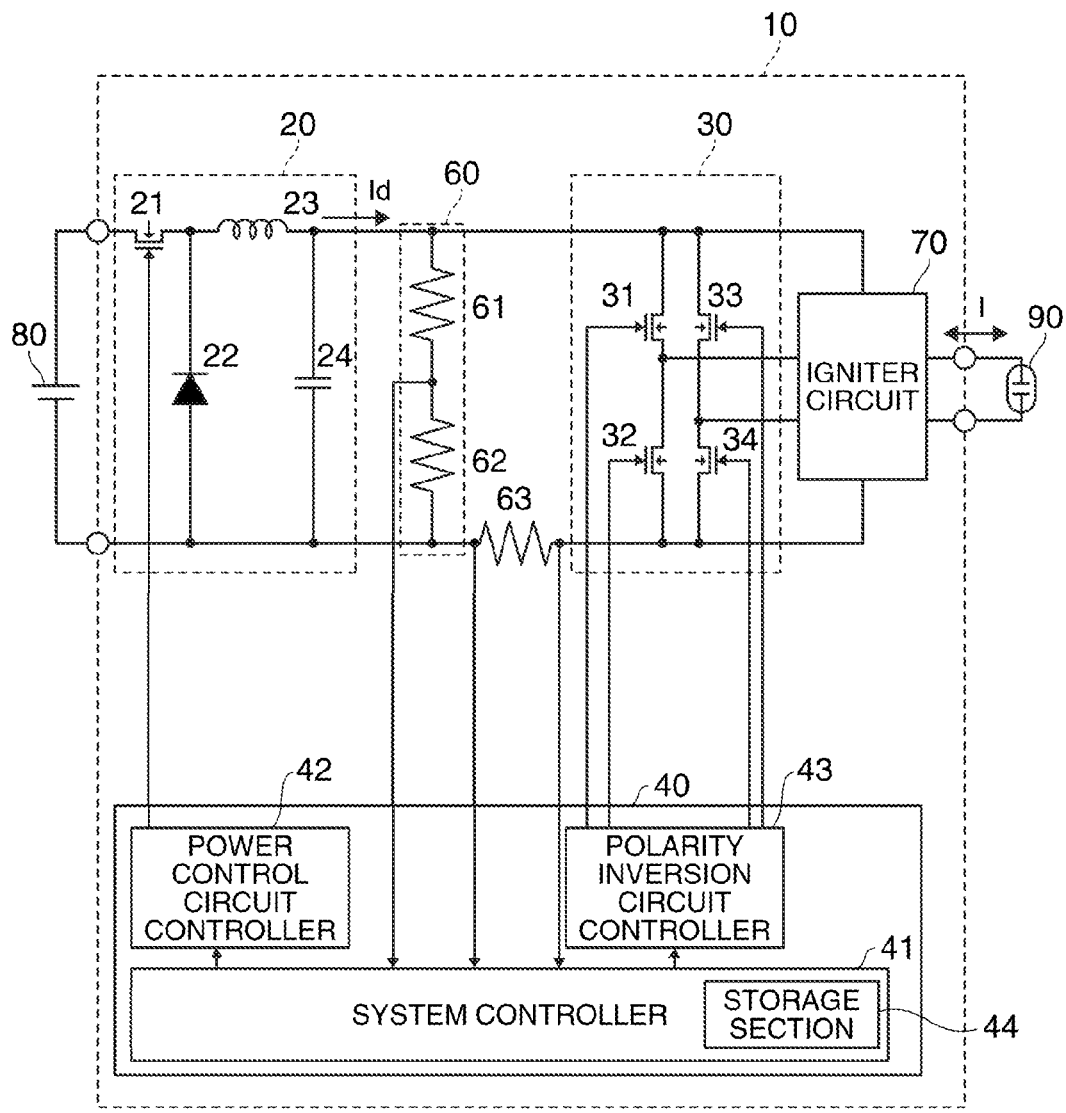
FIG. 3 illustrates an example of a circuit diagram of a discharge lamp lighting device according to the present embodiment.

2. Discharge Lamp Lighting Device According to First Embodiment (1) Configuration of Discharge Lamp Lighting Device FIG. 3 shows an example of the circuit diagram of the discharge lamp lighting device according to the present embodiment.

The discharge lamp lighting device 10 includes a power control circuit 20. The power control circuit 20 generates driving electric power supplied to the discharge lamp 90. In the present embodiment, the power control circuit 20 is formed as a down chopper circuit to which power from a DC power supply 80 is input and from which a direct current Id is output after dropping the input voltage.

The power control circuit 20 may be configured to include a switching element 21, a diode 22, a coil 23, and a condenser 24. The switching element 21 may be formed by a transistor, for example. In the present embodiment, one end of the switching element 21 is connected to a positive voltage side of the DC power supply 80, and the other end is connected to a cathode terminal of the diode 22 and one end of the coil 23. In addition, one end of the condenser 24 is connected to the other end of the coil 23, and the other end of the condenser 24 is connected to an anode terminal of the diode 22 and a negative voltage side of the DC power supply 80. A current control signal from a control unit 40 is input to a control terminal of the switching element 21 so that ON/OFF of the switching element 21 is controlled. For example, a PWM (Pulse Width Modulation) control signal may be used as the current control signal.

Here, when the switching element 21 is turned ON, a current flows through the coil 23 so that the energy is stored in the coil 23. Then, when the switching element 21 is turned OFF, the energy stored in the coil 23 is discharged in a path passing through the condenser 24 and the diode 22. As a result, the direct current Id corresponding to the rate of time for which the switching element 21 is in the ON state is generated.

The discharge lamp lighting device 10 includes a polarity inversion circuit 30. The direct current Id output from the power control circuit 20 is input to the polarity inversion circuit 30. Then, the polarity inversion circuit inverts the polarity of the direct current Id at a predetermined timing to thereby generate and output a driving current I that is a direct current, which continues for a controlled period, or that is an alternating current with an arbitrary frequency. In the present embodiment, the polarity inversion circuit 30 is formed by an inverter bridge circuit (full bridge circuit).

For example, the polarity inversion circuit 30 is configured to include first to fourth switching elements 31 to 34, such as transistors. That is, the polarity inversion circuit 30 is formed by connecting the first and second switching elements 31 and 32, which are connected in series, in parallel to the third and fourth switching elements 33 and 34 connected in series. A polarity inversion control signal from the control unit 40 is input to control terminals of the first to fourth switching elements 31 to 34 so that ON/OFF of the first to fourth switching elements 31 to 34 is controlled.

The polarity inversion circuit 30 alternately inverts the polarity of the direct current Id output from the power control circuit 20 by alternately repeating ON/OFF of the first and fourth switching elements 31 and 34 and the second and third switching elements 32 and 33 and generates and outputs the driving current I that is a direct current, which continues for a controlled period, or that is an alternating current, which has an arbitrary frequency, from a common connection point of the first and second switching elements 31 and 32 and a common connection point of the third and fourth switching elements 33 and 34.

That is, the polarity inversion circuit 30 performs control such that the second and third switching elements 32 and 33 are turned OFF when the first and fourth switching elements 31 and 34 are turned ON and the second and third switching elements 32 and 33 are turned ON when the first and fourth switching elements 31 and 34 are turned OFF. Accordingly, when the first and fourth switching elements 31 and 34 are turned ON, the driving current I which flows from one end of the condenser 24 through the first switching element 31, the discharge lamp 90, and the fourth switching element 34 in this order is generated. In addition, when the second and third switching elements 32 and 33 are turned ON, the driving current I which flows from one end of the condenser 24 through the third switching element 33, the discharge lamp 90, and the second switching element 32 in this order is generated.

In the present embodiment, a combination of the power control circuit 20 and the polarity inversion circuit 30 corresponds to a discharge lamp driving section.

The discharge lamp lighting device 10 includes the control unit 40. The control unit 40 controls a holding time of the driving current I for which the same polarity continues and a current value, a frequency, and the like of the driving current I by controlling the power control circuit 20 and the polarity inversion circuit 30. The control unit 40 performs polarity inversion control for the polarity inversion circuit 30 at the polarity inversion timing of the driving current I in order to control a holding time of the driving current I for which the same polarity continues and a frequency and the like of the driving current I. In addition, the control unit 40 performs current control for the power control circuit 20 in order to control the current value of the output direct current Id.

The configuration of the control unit 40 is not particularly limited. In the present embodiment, the control unit 40 is configured to include a system controller 41, a power control circuit controller 42, and a polarity inversion circuit controller 43. In addition, a part or the entirety of the control unit 40 may be formed by a semiconductor integrated circuit.

A system controller 41 controls the power control circuit 20 and the polarity inversion circuit 30 by controlling the power control circuit controller 42 and the polarity inversion circuit controller 43. The system controller 41 may control the power control circuit controller 42 and the polarity inversion circuit controller 43 on the basis of the driving current I and a driving voltage Vla detected by an operation detecting section 60 provided in the discharge lamp lighting device 10, which will be described later.

In the present embodiment, the system controller 41 is configured to include a storage section 44. In addition, the storage section 44 may be provided separately from the system controller 41.

The system controller 41 may control the power control circuit 20 and the polarity inversion circuit 30 on the basis of the information stored in the storage section 44. For example, the information regarding driving parameters, such as a holding time of the driving current I for which the same polarity continues, a current value, a frequency, a waveform, and a modulation pattern of the driving current I, may be stored in the storage section 44.

The power control circuit controller 42 controls the power control circuit 20 by outputting a current control signal to the power control circuit 20 on the basis of the control signal from the system controller 41.

The polarity inversion circuit controller 43 controls the polarity inversion circuit 30 by outputting a polarity inversion control signal to the polarity inversion circuit 30 on the basis of the control signal from the system controller 41.

Figure 4:
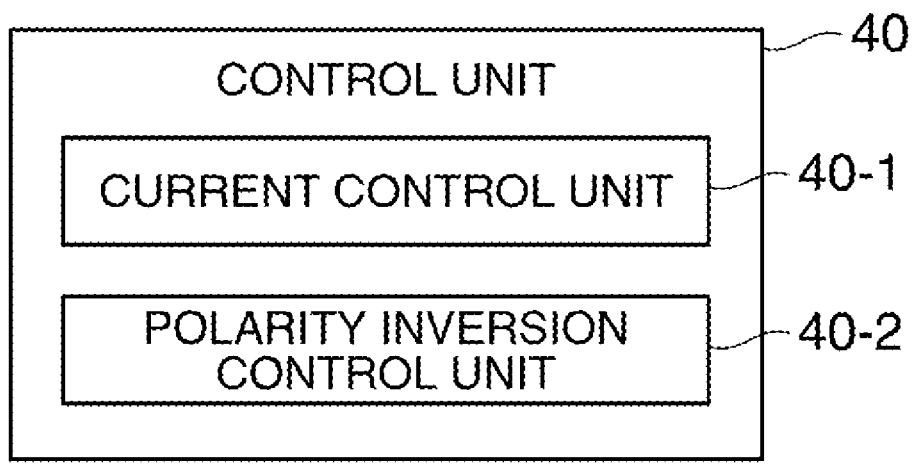
FIG. 4 is a view for explaining the configuration of a control unit in the present embodiment.

In addition, the control unit 40 may be realized by a dedicated circuit so that various kinds of control of the above-described processing or processing to be described later are performed. For example, the control unit 40 may be made to function as a computer by executing a control program stored in the storage section 44 by means of a CPU (Central Processing Unit), such that various kinds of control of the processing are performed. That is, as shown in FIG. 4, the control unit 40 may be made to function as a current control unit 40-1, which controls the power control circuit 20, and a polarity inversion control unit 40-2, which controls the polarity inversion circuit 30, by a control program.

The discharge lamp lighting device 10 may include an operation detecting section. The operation detecting unit may include a voltage detecting section 60, which detects the driving voltage Vla of the discharge lamp 90 and outputs the driving voltage information, or a current detecting section which detects the driving current I and outputs the driving current information, for example. In the present embodiment, the voltage detecting section 60 is configured to include first and second resistors 61 and 62.

In the present embodiment, the voltage detecting section detects the driving voltage Vla using a voltage divided by the first and second resistors 61 and 62, which are connected in series to each other and which are connected in parallel to the discharge lamp 90. Moreover, in the present embodiment, the current detecting section detects the driving current I using a voltage generated in a third resistor 63 connected in series to the discharge lamp 90.

The discharge lamp lighting device 10 may include an igniter circuit 70. The igniter circuit 70 operates only at the start of lighting the discharge lamp 90 and applies a high voltage (voltage which is higher than the voltage at the time of normal lighting of the discharge lamp 90), which is required to form a discharge path by dielectric breakdown between electrodes of the discharge lamp 90 at the start of lighting the discharge lamp 90, between the electrodes of the discharge lamp 90. In the present embodiment, the igniter circuit 70 is connected in parallel to the discharge lamp 90.

Figure 5A:
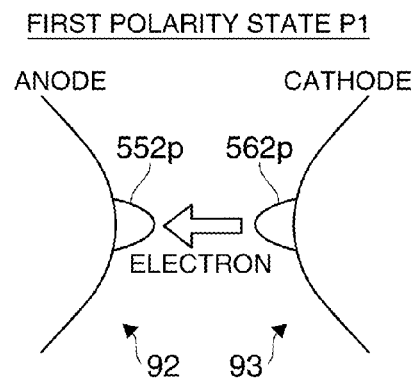
FIGS. 5A to 5D are explanatory views illustrating the relationship between the polarity of a driving current supplied to a discharge lamp and the temperature of an electrode.
Figure 5B:
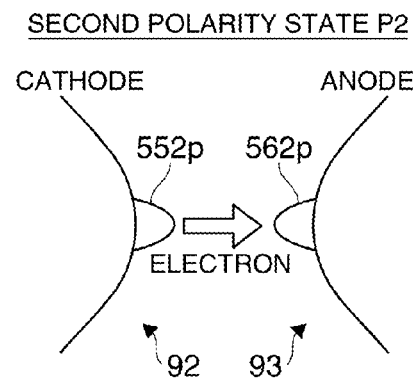

FIGS. 5A to 5D are explanatory views showing the relationship between the polarity of a driving current supplied to the discharge lamp 90 and the temperature of an electrode. FIGS. 5A and 5B show the operation state of the two electrodes 92 and 93. In FIGS. 5A and 5B, tips of the two electrodes 92 and 93 are shown. Projections 552p and 562p are provided on the tips of the electrodes 92 and 93, respectively. Discharge occurs between the projections 552p and 562p. In the present embodiment, the movement of the discharge position (arc position) in each of the electrodes 92 and 93 can be suppressed compared with the case where there is no projection. However, such projections may not be provided.

FIG. 5A shows a first polarity state P1 where the first electrode 92 operates as an anode and the second electrode 93 operates as a cathode. In the first polarity state P1, an electron moves from the second electrode 93 (cathode) to the first electrode 92 (anode) by discharge. An electron is emitted from the cathode (second electrode 93). The electron emitted from the cathode (second electrode 93) collides with the tip of the anode (first electrode 92). Heat is generated by the collision, and the temperature of the tip (projection 552p) of the anode (first electrode 92) rises.

FIG. 5B shows a second polarity state P2 where the first electrode 92 operates as a cathode and the second electrode 93 operates as an anode. In the second polarity state P2, an electron moves from the first electrode 92 to the second electrode 93 contrary to the first polarity state P1. As a result, the temperature of the tip (projection 562p) of the second electrode 93 rises.

Thus, the temperature of the anode is likely to rise compared with the cathode. Here, keeping a state where the temperature of one electrode is higher than that of the other electrode may cause various problems. For example, when the tip of a high-temperature electrode melts excessively, unintended electrode deformation may occur. As a result, the arc length may deviate from the appropriate value. In addition, an evaporated electrode material may adhere to an inner wall (surface of a translucent member surrounding the discharge space 91) of a sealed body to cause blackening. On the other hand, when the tip of a low-temperature electrode melts insufficiently, fine uneven parts generated on the tip may remain without melting away. As a result, so-called arc jump may occur (arc position is not stabilized and moves).

Figure 5C:
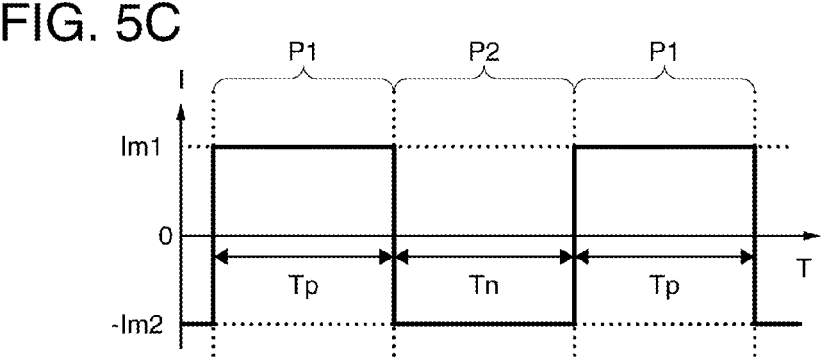

As a technique of suppressing such a problem, AC driving for changing the polarity of each electrode repeatedly may be used. FIG. 5C is a timing chart showing an example of the driving current I supplied to the discharge lamp 90 (FIG. 2). The horizontal axis indicates a time T, and the vertical axis indicates the current value of the driving current I. The driving current I indicates a current flowing through the discharge lamp 90. The positive value indicates the first polarity state P1, and the negative value indicates the second polarity state P2. In the example shown in FIG. 5C, a rectangular wave alternating current is used. In addition, the first and second polarity states P1 and P2 are repeated alternately. Here, a first polarity section Tp indicates a time for which the first polarity state P1 continues, and a second polarity section Tn indicates a time for which the second polarity state P2 continues. In addition, the average current value of the first polarity section Tp is 1 ml, and the average current value of the second polarity section Tn is −Im2. In addition, a frequency of the driving current I suitable for the driving of the discharge lamp 90 may be experimentally determined according to the characteristic of the discharge lamp 90 (for example, the value in a range of 30 Hz to 1 kHz is adopted). Similarly, the other values Im1, −Im2, Tp, and Tn may also be determined experimentally.

Figure 5D:
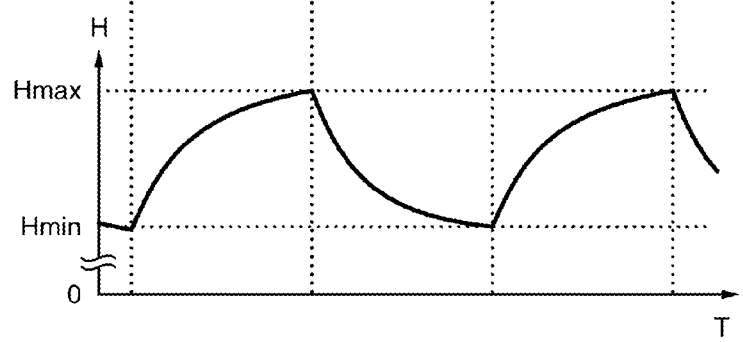

FIG. 5D is a timing chart showing a change in the temperature of the first electrode 92. The horizontal axis indicates a time T, and the vertical axis indicates a temperature H. The temperature H of the first electrode 92 rises in the first polarity state P1 and drops in the second polarity state P2. In addition, since the first and second polarity states P1 and P2 are repeated, the temperature H changes periodically between the minimum value Hmin and the maximum value Hmax. In addition, although not shown, the temperature of the second electrode 93 changes in an opposite phase to the temperature H of the first electrode 92. That is, the temperature of the second electrode 93 drops in the first polarity state P1 and rises in the second polarity state P2.

Since the tip of the first electrode 92 (projection 552p) melts in the first polarity state P1, the tip of the first electrode 92 (projection 552p) becomes smooth. As a result, the movement of the discharge position in the first electrode 92 can be suppressed. In addition, since the temperature of the tip of the second electrode 93 (projection 562p) drops, the excessive melting of the second electrode 93 (projection 562p) is suppressed. As a result, unintended electrode deformation or blackening can be suppressed. In the second polarity state P2, the states of the first and second electrodes 92 and 93 are opposite. Accordingly, a problem in each of the two electrodes 92 and 93 can be suppressed by repeating the two states P1 and P2.

Here, if the waveform of the current I is symmetrical, that is, if the waveform of the current I satisfies the conditions of "|Im1|=|−Im2|, Tp=Tn", the conditions of supplied electric power between the two electrodes 92 and 93 are the same. Accordingly, it is presumed that the temperature difference between the two electrodes 92 and 93 decreases. However, if driving using such a symmetrical current waveform continues, steady convection occurs in the discharge space 91 and an electrode material segregates or accumulates in a part of an axial portion of an electrode to grow in a needle shape. As a result, unintended discharge may occur toward a wall surface of the translucent material surrounding the discharge space 91. Such unintended discharge deteriorates the inner wall, resulting in reducing the lifespan of the discharge lamp 90. In addition, if driving using such a symmetrical current waveform continues, the electrode is maintained with fixed temperature distribution for a long time. As a result, the asymmetry of the electrode caused by temporal state change increases with time.

In addition, if an electrode is too heated over a wide range (if arc spot (hot spot on the electrode surface generated by arc discharge) becomes large), the shape of the electrode deforms by excessive melting. In addition, an electrode material evaporates excessively and adheres to the inner wall of the sealed body to cause blackening. On the contrary, if the electrode is too cold (arc spot is small), the tip of the electrode cannot melt sufficiently. As a result, the tip cannot be returned smoothly. That is, the tip of the electrode easily deforms. Accordingly, if a uniform energy supply state continues for the electrode, the tip (projections 552p and 562p) of the electrode easily deforms to the unintended shape.

(2) Example Regarding Control of Discharge Lamp Lighting Device

Next, a specific example regarding the control of the discharge lamp lighting device 10 according to the first embodiment will be described.

The control unit 40 of the discharge lamp lighting device 10 according to the first embodiment performs first DC driving processing D1 (first DC driving) and first AC driving processing A1 (first AC driving) alternately in a first section, and performs second DC driving processing D2 (second DC driving) and second AC driving processing A2 (second AC driving) alternately in a second section different from the first section.

Figure 6A:
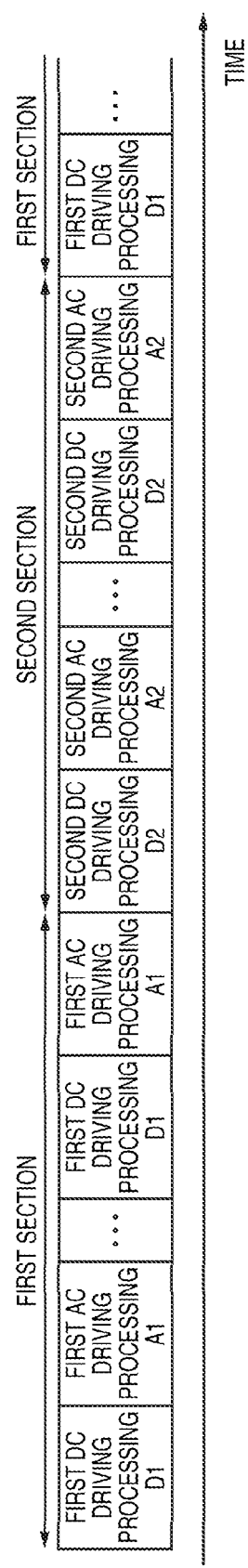
FIGS. 6A and 6B are views for explaining first and second sections.
Figure 6B:
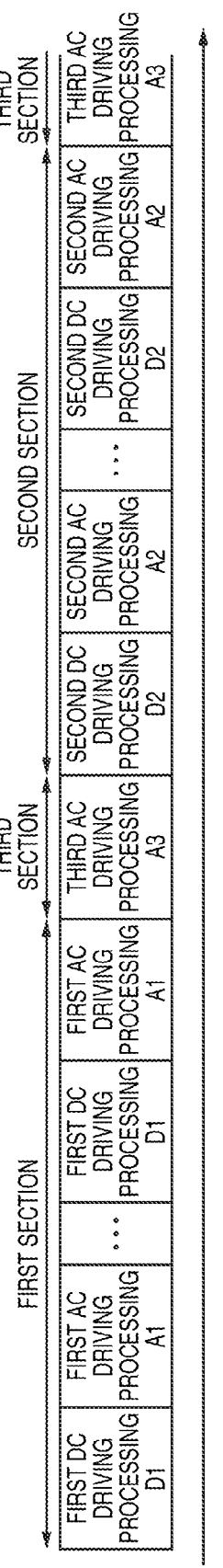

FIGS. 6A and 6B are views for explaining the first and second sections.

In the example shown in FIG. 6A, the control unit 40 controls a discharge lamp driving section such that the first section, in which the first DC driving processing D1 and the first AC driving processing A1 are alternately performed, and the second section, in which the second DC driving processing D2 and the second AC driving processing A2 are alternately performed, appear alternately.

Moreover, in the example shown in FIG. 6A, in the first section, the first DC driving processing D1 and the first AC driving processing A1 are alternately performed such that it starts in the first DC driving processing D1 and ends in the first AC driving processing A1. Moreover, in the second section, the second DC driving processing D2 and the second AC driving processing A2 are alternately performed such that it starts in the second DC driving processing D2 and ends in the second AC driving processing A2.

In addition, the control unit 40 may control the discharge lamp driving section such that a third section different from the first and second sections appears. For example, in the example shown in FIG. 6B, the control unit 40 controls the discharge lamp driving section such that a third section, in which third AC driving processing A3 is performed, appears between the first and second sections.

The control unit 40 performs control of supplying a first direct current, which starts from the first polarity and has a first polarity component, as the driving current I in the first DC driving processing D1 and performs control of supplying a first alternating current, which repeats a first polarity component and a second polarity component at a first frequency, as the driving current I in the first AC driving processing A1.

The control unit 40 performs control of supplying a second direct current, which starts from the second polarity and has a second polarity component, as the driving current I in the second DC driving processing D2 and performs control of supplying a second alternating current, which repeats a first polarity component and a second polarity component at a second frequency, as the driving current I in the second AC driving processing A2.

Moreover, in the example shown in FIG. 6B, the control unit 40 may perform control of supplying a third alternating current, which repeats a first polarity component and a second polarity component at a third frequency different from the first and second frequencies, as the driving current I in the third AC driving processing A3.

Figure 7A:
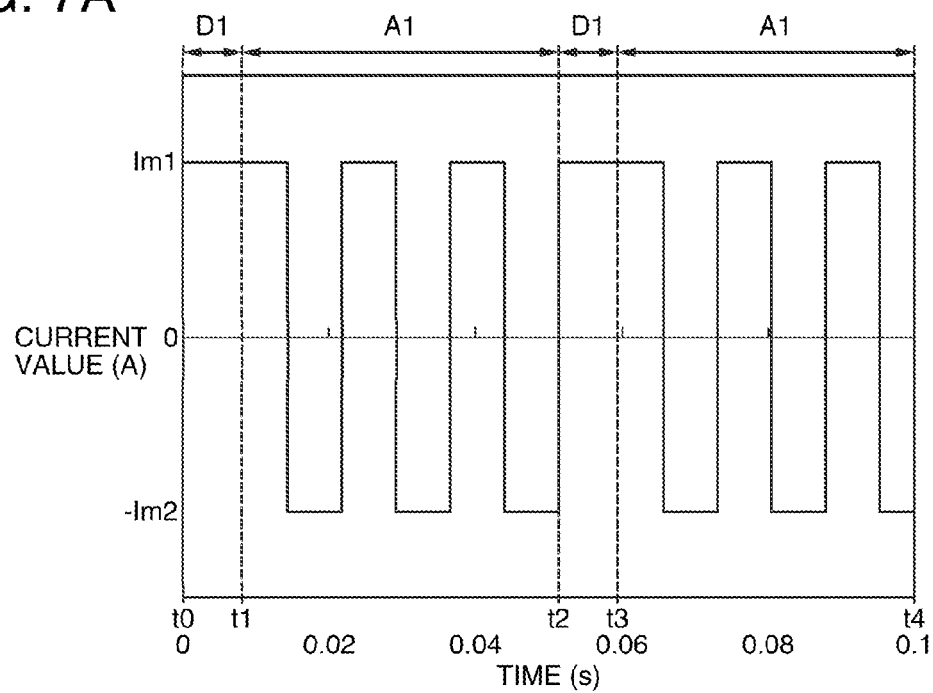
FIG. 7A is a timing chart illustrating an example of a waveform of a driving current in the first section.
Figure 7B:
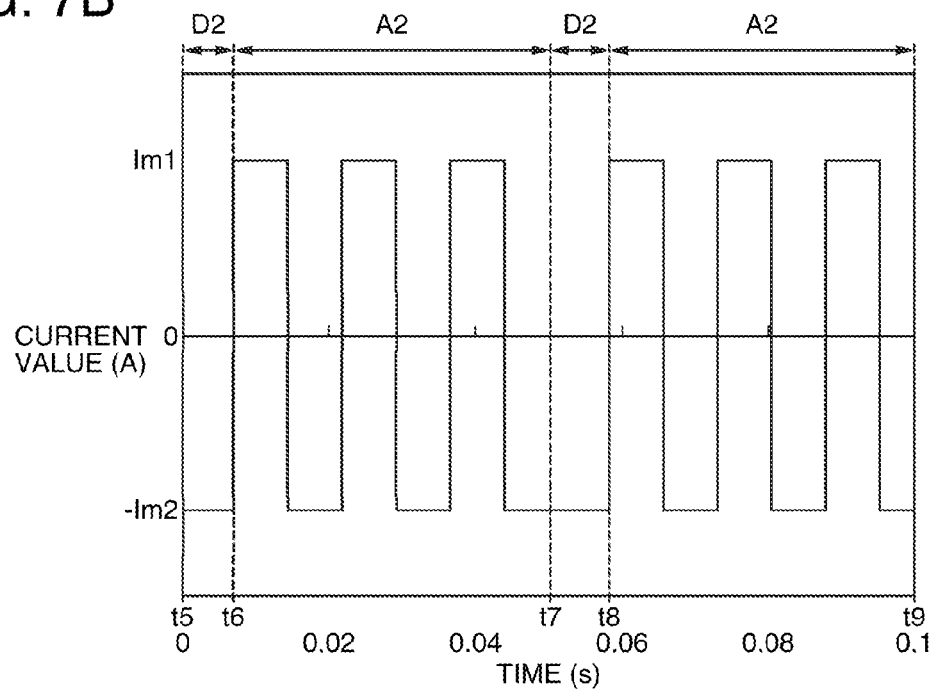
FIG. 7B is a timing chart illustrating an example of a waveform of the driving current in the second section.

FIG. 7A is a timing chart showing an example of a waveform of the driving current I in the first section, and FIG. 7B is a timing chart showing an example of a waveform of the driving current I in the second section. In FIGS. 7A and 7B, the horizontal axis indicates a time and the vertical axis indicates the current value of the driving current I. In FIGS. 7A and 7B, the driving current I with the first polarity is set to have a positive value, and the driving current I with the second polarity is set to have a negative value.

In the example shown in FIG. 7A, the control unit 40 performs the first DC driving processing D1 in a period from time t0 to time t1, the first AC driving processing A1 in a period from time t1 to time t2, the first DC driving processing D1 in a period from time t2 to time t3, and the first AC driving processing A1 in a period from time t3 to time t4.

In the example shown in FIG. 7A, the control unit 40 performs control of supplying the driving current I, which holds the same polarity (first polarity) for a period longer than a ½ period of the driving current I in the first AC driving processing A1, in the first DC driving processing D1.

In addition, in the example shown in FIG. 7A, the control unit 40 performs control of supplying the driving current I, which is a rectangular wave alternating current starting from a phase of the same polarity (first polarity) as in the previous first DC driving processing D1, in the first AC driving processing A1.

In the example shown in FIG. 7B, the control unit 40 performs the second DC driving processing D2 in a period from time t5 to time t6, the second AC driving processing A2 in a period from time t6 to time t7, the second DC driving processing D2 in a period from t7 to time t8, and the second AC driving processing A2 in a period from time t8 to time t9.

In the example shown in FIG. 7B, the control unit 40 performs control of supplying the driving current I, which holds the same polarity (second polarity) for a period longer than a ½ period of the driving current I in the second AC driving processing A2, in the second DC driving processing D2.

Moreover, in the example shown in FIG. 7B, similar to the first AC driving processing A1, the control unit 40 performs control of supplying the driving current I, which is a rectangular wave alternating current starting from a phase of the same polarity (first polarity) as in the first DC driving processing D1, in the second AC driving processing A2.

In addition, a period for which the discharge lamp 90 is driven under the same driving condition is described as a step, a set of a period for which DC driving processing is performed and a period for which AC driving processing is performed is described as a sequence, and the number of sequences included in one step is described as the cycle number.

Since a current flows with the same polarity in a period for which the driving current I is a direct current, the arc spot becomes large. Accordingly, an electrode tip portion including an unnecessary projection and the like can be melted smoothly. Since a current which repeats the first and second polarities alternately flows in a period for which the driving current I is an alternating current, the arc spot becomes small. Accordingly, the growth of a projection of an electrode tip portion needed as an discharge origin can be promoted.

Accordingly, by alternately repeating a period for which the driving current I is a direct current and a period for which the driving current I is an alternating current by appropriately setting the driving conditions (for example, a frequency in a period for which the driving current I is an alternating current, the length of a period for which the driving current I is a direct current, and the length of a period for which the driving current I is an alternating current), the electrode shape is satisfactorily maintained. As a result, the discharge lamp 90 can be stably lit.

However, if the discharge lamp 90 is continuously turned on under the same driving condition, steady convection caused by light emission is formed within the discharge lamp 90. As a result, unbalanced consumption of an electrode or unbalanced precipitation of an electrode material may occur.

Accordingly, in the discharge lamp lighting device 10 according to the first embodiment, the control unit 40 temporally changes the length of at least one of a period, for which the first DC driving processing D1 is performed, and a period, for which the second DC driving processing D2 is performed. For example, the control unit 40 may temporally change the length of at least one of the period, for which the first DC driving processing D1 is performed, and the period, for which the second DC driving processing D2 is performed, so as to repeat increase and decrease. In this case, a temperature difference (for example, several tens to hundreds of centigrade) occurs between both electrodes of the discharge lamp 90. Accordingly, since the formation of steady convection in the discharge lamp 90 is suppressed, unbalanced consumption of the electrode or unbalanced precipitation of the electrode material can be prevented.

In addition, the control unit 40 may temporally change the length of at least one of the period, for which the first DC driving processing D1 is performed, and the period, for which the second DC driving processing D2 is performed, so as to repeat increase and decrease in a stepwise manner.

Figure 8A:
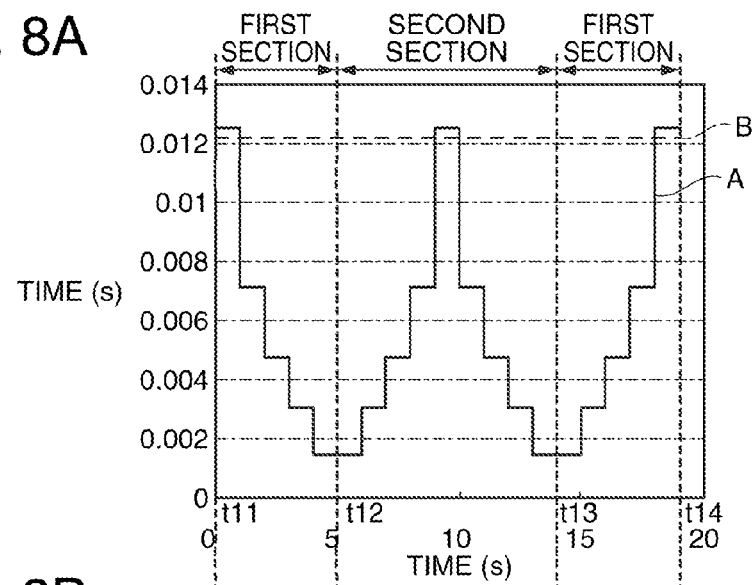
FIG. 8A is a graph illustrating temporal changes of the length of a period for which DC driving processing is performed and the length of a period for which AC driving processing is performed.
Figure 8B:
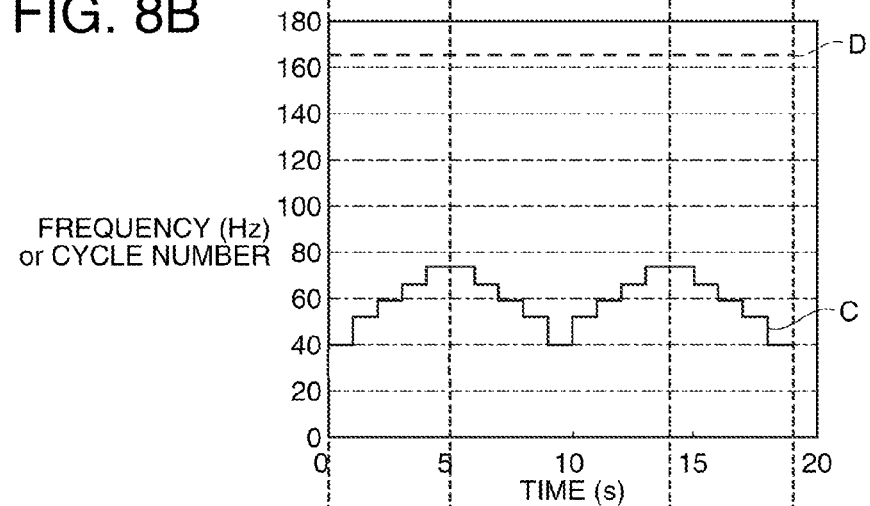
FIG. 8B is a graph illustrating temporal changes of a frequency and a cycle number.
Figure 8C:
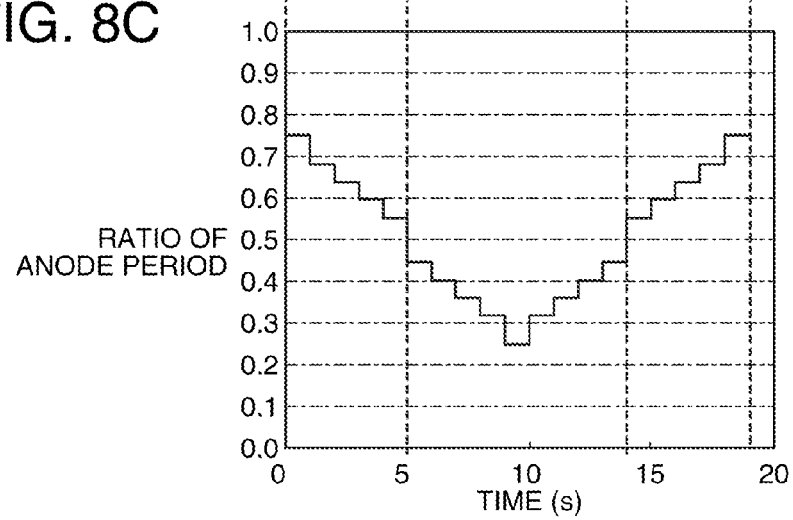
FIG. 8C is a graph illustrating a temporal change in the ratio of an anode period.

FIG. 8A is a graph showing temporal changes of the length of a period for which DC driving processing is performed and the length of a period for which AC driving processing is performed, FIG. 8B is a graph showing temporal changes of a frequency and a cycle number, and FIG. 8C is a graph showing a temporal change in the ratio of an anode period. In FIGS. 8A to 8C, the horizontal axis indicates an elapsed time. In addition, a period from time t11 to time t12 and a period from time t13 to time t14 are first sections, and a period from time t12 to time t13 is a second section.

In FIG. 8A, the length of a period for which DC driving processing is performed is expressed by a solid line A. The solid line A indicates the length of a period, for which the first DC driving processing D1 is performed, in the first section and the length of a period, for which the second DC driving processing D2 is performed, in the second section. Moreover, in FIG. 8A, the length of a period for which AC driving processing is performed is expressed by a dotted line B. The dotted line B indicates the length of a period, for which the first AC driving processing A1 is performed, in the first section and the length of a period, for which the second AC driving processing A2 is performed, in the second section.

In FIG. 8B, the cycle number is expressed by a solid line C. The solid line C indicates a cycle number, at which the first AC driving processing A1 is performed, in the first section and a cycle number, at which the second AC driving processing A2 is performed, in the second section. In addition, in FIG. 8B, a frequency is expressed by a dotted line D. The dotted line D indicates a first frequency in the first AC driving processing A1 in the first section and a second frequency in the second AC driving processing A2 in the second section.

In FIG. 8C, the ratio of an anode period indicates the ratio of a time, for which the first electrode 92 serves as an anode, in a period of one step. In addition, the total sum of the ratio of a time, for which the first electrode 92 is an anode, and the ratio of a time, for which the second electrode 93 is an anode, is 1. That is, the relationship between the anode ratio of the first electrode 92 and the anode ratio of the second electrode 93 is expressed by the following expression (1).

Anode ratio of second electrode 93=1−anode ratio of first electrode 92 (1)

In the example shown in FIG. 8A, one step is set as 1 second, and the control unit 40 performs control of decreasing the length of the period, for which the first DC driving processing D1 is performed, in a stepwise manner from time t11 to time t12. From time t12 to time t13, the control unit 40 performs control of decreasing the length of the period, for which the second DC driving processing D2 is performed, in a stepwise manner after increasing the length of the period in a stepwise manner. From time t13 to time t14, the control unit 40 performs control of increasing the length of the period, for which the first DC driving processing D1 is performed, in a stepwise manner.

In addition, in the example shown in FIG. 8A, the length of the period for which the first AC driving processing A1 is performed and the length of the period for which the second AC driving processing A2 is performed are constant. Accordingly, in order to make the length of one step constant, the cycle number is changed according to the length of the period for which the first DC driving processing D1 is performed and the length of the period for which the second DC driving processing D2 is performed, as shown in FIG. 8B. Moreover, in the example shown in FIG. 8B, both the first frequency in the first AC driving processing A1 and the second frequency in the second AC driving processing A2 are constant values of the same value.

If the driving conditions change with time as shown in FIGS. 8A and 8B, the anode ratio of the first electrode 92 changes with time as shown in FIG. 8C. The electrode temperature becomes high as the anode ratio increases, and the electrode temperature becomes low as the anode ratio decreases. Accordingly, FIG. 8C means that the temperature of the first electrode 92 changes with time. In addition, the anode ratio of the second electrode 93 is expressed by expression (1) and changes opposite to the anode ratio of the first electrode 93. Accordingly, FIG. 8C means that the temperature of the second electrode 93 changes with time.

In addition, in the above example, the case was described in which both the length of the period, for which the first DC driving processing D1 was performed, and the length of the period, for which the second DC driving processing D2 was performed, changed with time such that stepwise increase and decrease were repeated. However, for example, when the thermal conditions (for example, easiness of an increase in the electrode temperature) of the first and second electrodes 92 and 93 of the discharge lamp 90 are largely different, it is possible to change either one of the length of the period for which the first DC driving processing D1 is performed and the length of the period for which the second DC driving processing D2 is performed so that the anode ratio on one electrode side, at which the temperature increases, becomes lower than that on the other side.

As shown in the example shown in FIGS. 8A to 8C, it is thought that the effects of disturbing the convection are larger in the case of changing the length of at least one of the period, for which the first DC driving processing D1 is performed, and the period, for which the second DC driving processing D2 is performed, in a stepwise manner than in the case of changing the length continuously. In this case, since the formation of steady convection in the discharge lamp 90 is further suppressed, unbalanced consumption of an electrode or unbalanced precipitation of an electrode material can be prevented.

3. Discharge Lamp Lighting Device According to Second Embodiment

In a discharge lamp lighting device 10 according to a second embodiment, a control unit 40 temporally changes the length of at least one of a period, for which the first AC driving processing A1 is performed, and a period, for which the second AC driving processing A2 is performed. For example, the control unit 40 may temporally change the length of at least one of the period, for which the first AC driving processing A1 is performed, and the period, for which the second AC driving processing A2 is performed, so as to repeat increase and decrease. In this case, since a temperature difference (for example, several tens to hundreds of centigrade) occurs between both electrodes of the discharge lamp 90, the formation of steady convection in the discharge lamp 90 is suppressed and unbalanced consumption of the electrode or unbalanced precipitation of the electrode material can be prevented accordingly. In addition, since excessive melting of an electrode tip portion is suppressed, it is possible to prevent blackening, which is a phenomenon in which an electrode material adheres to an inner wall of a sealed body, and to maintain a projection of the electrode tip satisfactorily.

In addition, the control unit 40 may temporally change the length of at least one of the period, for which the first AC driving processing A1 is performed, and the period, for which the second AC driving processing A2 is performed, so as to repeat increase and decrease in a stepwise manner.

Figure 9A:
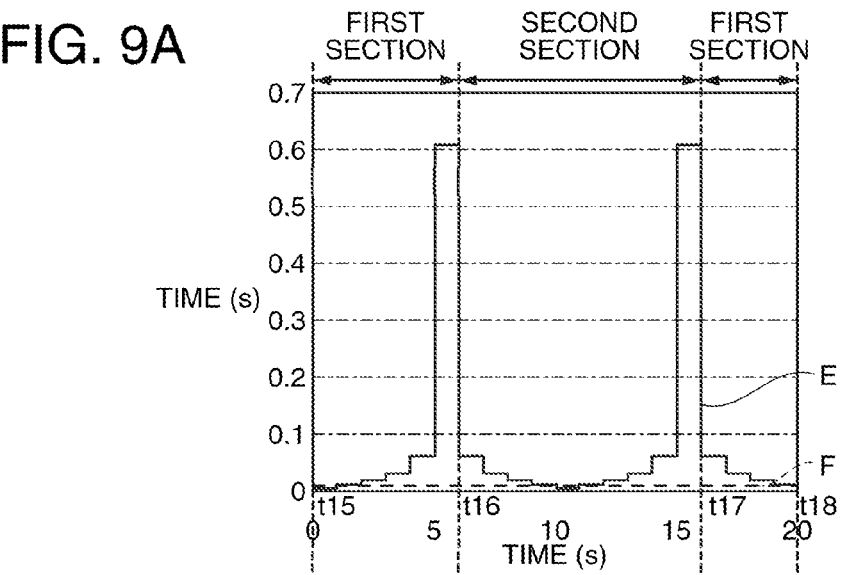
FIG. 9A is a graph illustrating temporal changes of the length of a period for which DC driving processing is performed and the length of a period for which AC driving processing is performed.
Figure 9B:
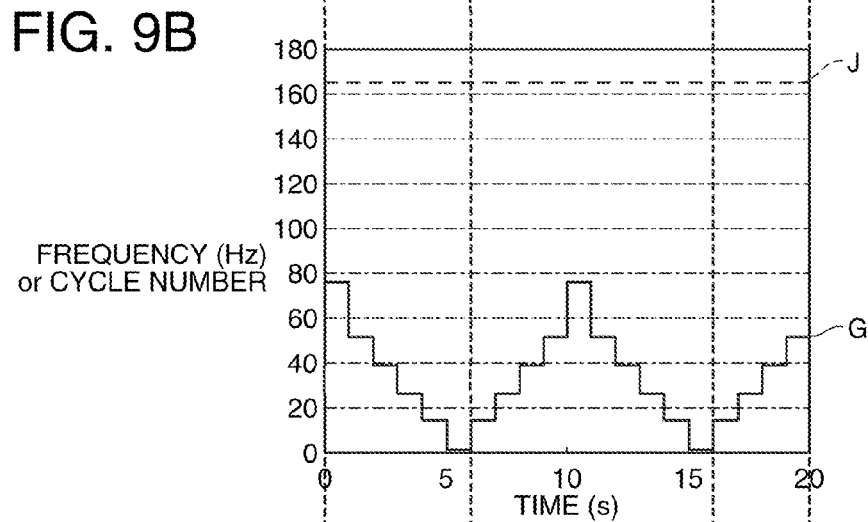
FIG. 9B is a graph illustrating temporal changes of a frequency and a cycle number.
Figure 9C:
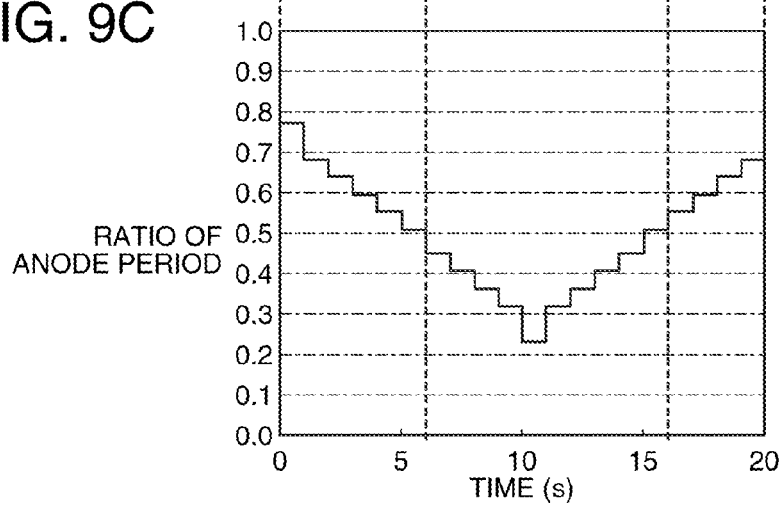
FIG. 9C is a graph illustrating a temporal change in the ratio of an anode period.

FIG. 9A is a graph showing temporal changes of the length of a period for which DC driving processing is performed and the length of a period for which AC driving processing is performed, FIG. 9B is a graph showing temporal changes of a frequency and a cycle number, and FIG. 9C is a graph showing a temporal change in the ratio of an anode period. In FIGS. 9A to 9C, the horizontal axis indicates an elapsed time. In addition, a period from time t15 to time t16 and a period from time t17 to time t18 are first sections, and a period from time t16 to time t17 is a second section.

In FIG. 9A, the length of a period for which AC driving processing is performed is expressed by a solid line E. The solid line E indicates the length of a period, for which the first AC driving processing A1 is performed, in the first section and the length of a period, for which the second AC driving processing A2 is performed, in the second section. Moreover, in FIG. 9A, the length of a period for which DC driving processing is performed is expressed by a dotted line F. The dotted line F indicates the length of a period, for which the first DC driving processing D1 is performed, in the first section and the length of a period, for which the second DC driving processing D2 is performed, in the second section.

In FIG. 9B, the cycle number is expressed by a solid line G. The solid line G indicates a cycle number, at which the first AC driving processing A1 is performed, in the first section and a cycle number, at which the second AC driving processing A2 is performed, in the second section. In addition, in FIG. 9B, a frequency is expressed by a dotted line J. The dotted line J indicates a first frequency in the first AC driving processing A1 in the first section and a second frequency in the second AC driving processing A2 in the second section.

In FIG. 9C, the ratio of an anode period indicates the ratio of a time, for which the first electrode 92 serves as an anode, in a period of one step. In addition, the total sum of the ratio of a time, for which the first electrode 92 is an anode, and the ratio of a time, for which the second electrode 93 is an anode, is 1. That is, the relationship between the anode ratio of the first electrode 92 and the anode ratio of the second electrode 93 is expressed by the above-described expression (1).

In the example shown in FIG. 9A, one step is set as 1 second, and the control unit 40 performs control of increasing the length of the period, for which the first AC driving processing A1 is performed, in a stepwise manner from time t15 to time t16. From time t16 to time t17, the control unit 40 performs control of increasing the length of the period, for which the second AC driving processing A2 is performed, in a stepwise manner after decreasing the length of the period in a stepwise manner. From time t17 to time t18, the control unit 40 performs control of decreasing the length of the period, for which the first AC driving processing A1 is performed, in a stepwise manner.

In addition, in the example shown in FIG. 9A, the length of the period for which the first DC driving processing D1 is performed and the length of the period for which the second DC driving processing D2 is performed are constant. Accordingly, in order to make the length of one step constant, the cycle number is changed according to the length of the period for which the first AC driving processing A1 is performed and the length of the period for which the second AC driving processing A2 is performed, as shown in FIG. 9B. Moreover, in the example shown in FIG. 9B, both the first frequency in the first AC driving processing A1 and the second frequency in the second AC driving processing A2 are constant values of the same value.

If the driving conditions change with time as shown in FIGS. 9A and 9B, the anode ratio of the first electrode 92 changes with time as shown in FIG. 9C. The electrode temperature becomes high as the anode ratio increases, and the electrode temperature becomes low as the anode ratio decreases. Accordingly, FIG. 9C means that the temperature of the first electrode 92 changes with time. In addition, the anode ratio of the second electrode 93 is expressed by expression (1) and changes opposite to the anode ratio of the first electrode 93. Accordingly, FIG. 9C means that the temperature of the second electrode 93 changes with time.

In addition, in the above example, the case was described in which both the length of the period, for which the first AC driving processing A1 was performed, and the length of the period, for which the second AC driving processing A2 was performed, changed with time such that stepwise increase and decrease were repeated. However, for example, when the thermal conditions (for example, easiness of an increase in the electrode temperature) of the first and second electrodes 92 and 93 of the discharge lamp 90 are largely different, it is possible to change either one of the length of the period for which the first AC driving processing A1 is performed and the length of the period for which the second AC driving processing A2 is performed so that the anode ratio on one electrode side, at which the temperature increases, becomes lower than that on the other side.

As shown in the example shown in FIGS. 9A to 9C, it is thought that the effects of disturbing the convection are larger in the case of changing the length of at least one of the period, for which the first AC driving processing A1 is performed, and the period, for which the second AC driving processing A2 is performed, in a stepwise manner than in the case of changing the length continuously. In this case, since the formation of steady convection in the discharge lamp 90 is further suppressed, unbalanced consumption of an electrode or unbalanced precipitation of an electrode material can be prevented.

4. Discharge Lamp Lighting Device According to Third Embodiment

In a discharge lamp lighting device 10 according to a third embodiment, a control unit 40 temporally changes the length of at least one of the period for which the first DC driving processing D1 is performed and the period for which the second DC driving processing D2 is performed and temporally changes the length of at least one of the period for which the first AC driving processing A1 is performed and the period for which the second AC driving processing A2 is performed. For example, the control unit 40 may temporally change the length of at least one of the period for which the first DC driving processing D1 is performed and the period for which the second DC driving processing D2 is performed such that increase and decrease are repeated, and may temporally change the length of at least one of the period for which the first AC driving processing A1 is performed and the period for which the second AC driving processing A2 is performed such that increase and decrease are repeated.

In this case, a temperature difference (for example, several tens to hundreds of centigrade) occurs between both electrodes of the discharge lamp 90. Accordingly, since the formation of steady convection in the discharge lamp 90 is suppressed, unbalanced consumption of the electrode or unbalanced precipitation of the electrode material can be prevented.

For example, the control unit 40 may temporally change the length of at least one of the period for which the first DC driving processing D1 is performed and the period for which the second DC driving processing D2 is performed such that stepwise increase and decrease are repeated, and may temporally change the length of at least one of the period for which the first AC driving processing A1 is performed and the period for which the second AC driving processing A2 is performed such that stepwise increase and decrease are repeated. In this case, since the formation of steady convection in the discharge lamp 90 is further suppressed, unbalanced consumption of an electrode or unbalanced precipitation of an electrode material can be prevented.

5. Discharge Lamp Lighting Device According to Fourth Embodiment

In a discharge lamp lighting device 10 according to a fourth embodiment, a control unit 40 temporally changes the length of at least one of a period for which the first AC driving processing A1 is performed and a period for which the second AC driving processing A2 is performed and temporally changes a first frequency in the first AC driving processing A1 and a second frequency in the second AC driving processing A2. For example, the control unit 40 may change the first and second frequencies such that the first frequency increases as the period, for which the first AC driving processing A1 is performed, decreases and the second frequency increases as the period, for which the second AC driving processing A2 is performed, decreases.

Generally, since an arc spot in which an electrode melts becomes narrow as a frequency of the driving current I increases, loss of a projection caused by excessive melting can be suppressed. In addition, by alternately applying positive and negative currents at shorter periods so that a projection of an electrode tip melted in DC driving processing is stimulated by intermittently giving particle collision at the time of a cathode in AC driving processing, the projection can be maintained satisfactorily. Therefore, during a period for which the electrode temperature of any electrode is high (period for which the anode ratio is not balanced), it is preferable to control the first and second frequencies to be relatively high.

In this case, since a temperature difference (for example, several tens to hundreds of centigrade) occurs between both electrodes of the discharge lamp 90, the formation of steady convection in the discharge lamp 90 is suppressed and unbalanced consumption of the electrode or unbalanced precipitation of the electrode material can be prevented accordingly. In addition, since loss of a projection or adhesion of an electrode material, which evaporates by excessive melting of an electrode tip portion that becomes an arc origin, to the inner wall of the sealed body is suppressed, it is possible to prevent blackening and to maintain the shape of the projection of the electrode tip portion satisfactorily.

In addition, the control unit 40 may temporally change the length of at least one of the period for which the first AC driving processing A1 is performed and the period for which the second AC driving processing A2 is performed such that stepwise increase and decrease are repeated, and may temporally change the first frequency in the first AC driving processing A1 and the second frequency in the second AC driving processing A2 such that stepwise increase and decrease are repeated.

Figure 10A:
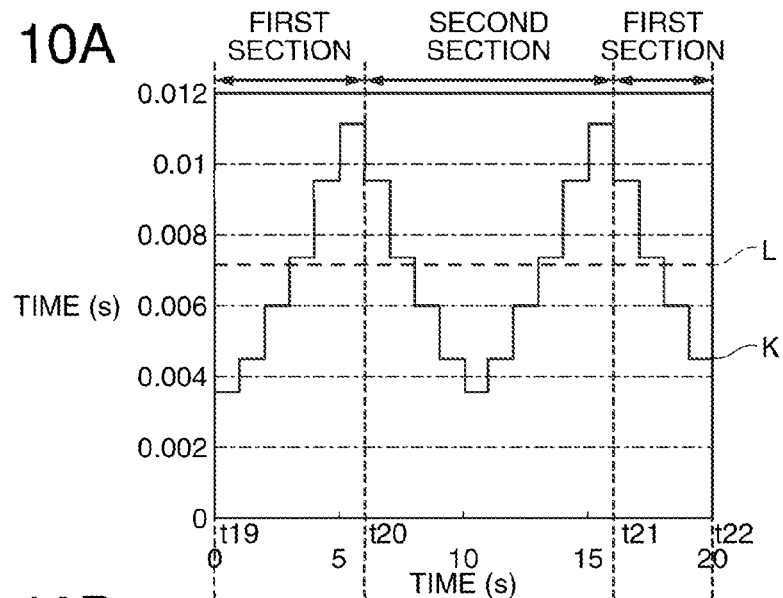
FIG. 10A is a graph illustrating temporal changes of the length of a period for which DC driving processing is performed and the length of a period for which AC driving processing is performed.
Figure 10B:
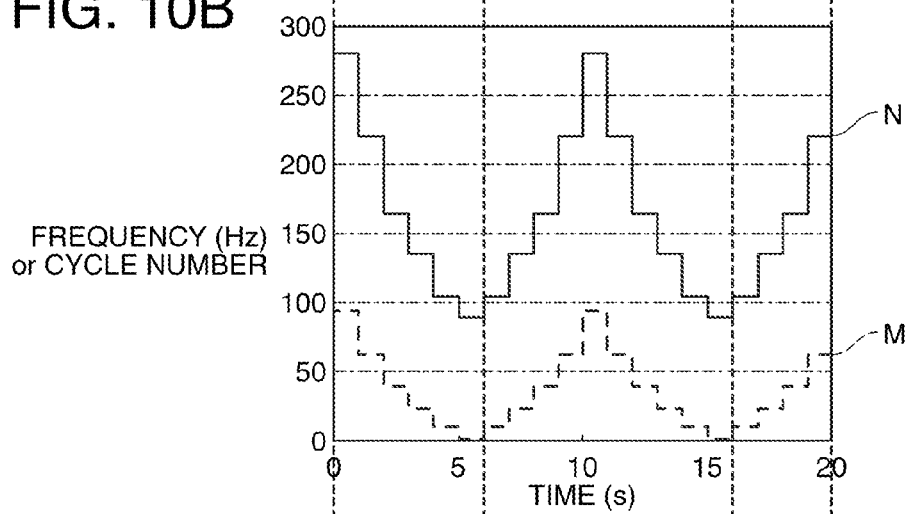
FIG. 10B is a graph illustrating temporal changes of a frequency and a cycle number.
Figure 10C:
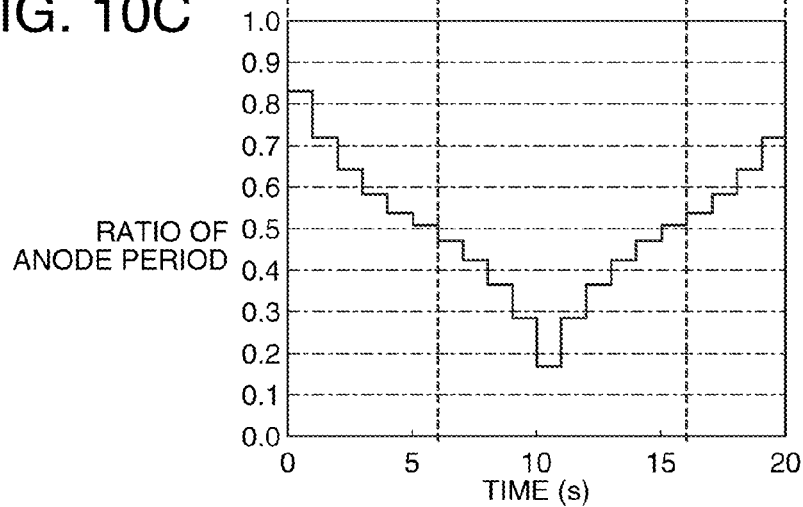
FIG. 10C is a graph illustrating a temporal change in the ratio of an anode period.

FIG. 10A is a graph showing temporal changes of the length of a period for which DC driving processing is performed and the length of a period for which AC driving processing is performed, FIG. 10B is a graph showing temporal changes of a frequency and a cycle number, and FIG. 10C is a graph showing a temporal change in the ratio of an anode period. In FIGS. 9A to 9C, the horizontal axis indicates an elapsed time. In addition, a period from time t19 to time t20 and a period from time t21 to time t22 are first sections, and a period from time t20 to time t21 is a second section.

In FIG. 10A, the length of a period for which AC driving processing is performed is expressed by a solid line K. The solid line K indicates the length of a period, for which the first AC driving processing A1 is performed, in the first section and the length of a period, for which the second AC driving processing A2 is performed, in the second section. Moreover, in FIG. 10A, the length of a period for which DC driving processing is performed is expressed by a dotted line L. The dotted line L indicates the length of a period, for which the first DC driving processing D1 is performed, in the first section and the length of a period, for which the second DC driving processing D2 is performed, in the second section.

In FIG. 10B, the cycle number is expressed by a dotted line M. The dotted line M indicates a cycle number, at which the first AC driving processing A1 is performed, in the first section and a cycle number, at which the second AC driving processing A2 is performed, in the second section. In addition, in FIG. 10B, a frequency is expressed by a solid line N. The solid line N indicates a first frequency in the first AC driving processing A1 in the first section and a second frequency in the second AC driving processing A2 in the second section.

In FIG. 10C, the ratio of an anode period indicates the ratio of a time, for which the first electrode 92 serves as an anode, in a period of one step. In addition, the total sum of the ratio of a time, for which the first electrode 92 is an anode, and the ratio of a time, for which the second electrode 93 is an anode, is 1. That is, the relationship between the anode ratio of the first electrode 92 and the anode ratio of the second electrode 93 is expressed by the above-described expression (1).

In the example shown in FIG. 10A, one step is set as 1 second, and the control unit 40 performs control of increasing the length of the period, for which the first AC driving processing A1 is performed, in a stepwise manner from time t19 to time t20. From time t20 to time t21, the control unit 40 performs control of increasing the length of the period, for which the second AC driving processing A2 is performed, in a stepwise manner after decreasing the length of the period in a stepwise manner. From time t21 to time t22, the control unit 40 performs control of decreasing the length of the period, for which the first AC driving processing A1 is performed, in a stepwise manner.

In addition, in the example shown in FIG. 10A, the length of the period for which the first DC driving processing D1 is performed and the length of the period for which the second DC driving processing D2 is performed are constant. Accordingly, in order to make the length of one step constant, the cycle number is changed according to the length of the period for which the first AC driving processing A1 is performed and the length of the period for which the second AC driving processing A2 is performed, as shown in FIG. 10B. In addition, in the example shown in FIG. 10B, the frequencies in the first AC driving processing A1 and the second AC driving processing A2 are changed such that the first frequency increases as the period, for which the first AC driving processing A1 is performed, decreases and the second frequency increases as the period, for which the second AC driving processing A2 is performed, decreases.

If the driving conditions change with time as shown in FIGS. 10A and 10B, the anode ratio of the first electrode 92 changes with time as shown in FIG. 10C. The electrode temperature becomes high as the anode ratio increases, and the electrode temperature becomes low as the anode ratio decreases. Accordingly, FIG. 10C means that the temperature of the first electrode 92 changes with time. In addition, the anode ratio of the second electrode 93 is expressed by expression (1) and changes opposite to the anode ratio of the first electrode 93. Accordingly, FIG. 10C means that the temperature of the second electrode 93 changes with time.

In the example shown in FIGS. 10A to 10C, since the first frequency increases as the period for which the first AC driving processing A1 is performed decreases and the second frequency increases as the period for which the second AC driving processing A2 is performed decreases, a temperature difference (for example, several tens to hundreds of centigrade) occurs between both electrodes of the discharge lamp 90. Accordingly, since the formation of steady convection in the discharge lamp 90 is suppressed, unbalanced consumption of the electrode or unbalanced precipitation of the electrode material can be prevented. In addition, since loss of a projection or adhesion of an electrode material, which evaporates by excessive melting of an electrode tip portion that becomes an arc origin, to the inner wall of the sealed body is suppressed, it is possible to prevent blackening and to maintain the shape of the projection of the electrode tip portion satisfactorily.

6. Discharge Lamp Lighting Device According to Fifth Embodiment

In a discharge lamp lighting device 10 according to a fifth embodiment, a control unit 40 temporally changes the length of at least one of a period for which the first DC driving processing D1 is performed and a period for which the second DC driving processing D2 is performed and temporally changes a first frequency in the first AC driving processing A1 and a second frequency in the second AC driving processing A2. For example, the control unit 40 may change the first and second frequencies such that the first frequency increases as the period, for which the first DC driving processing D1 is performed, increases and the second frequency increases as the period, for which the second DC driving processing D2 is performed, increases.

In addition, the control unit 40 may temporally change the length of at least one of the period for which the first DC driving processing D1 is performed and the period for which the second DC driving processing D2 is performed such that stepwise increase and decrease are repeated, and may temporally change the first frequency in the first AC driving processing A1 and the second frequency in the second AC driving processing A2 such that stepwise increase and decrease are repeated.

In this case, similar to the fourth embodiment, since a temperature difference (for example, several tens to hundreds of centigrade) occurs between both electrodes of the discharge lamp 90, the formation of steady convection in the discharge lamp 90 is suppressed and unbalanced consumption of the electrode or unbalanced precipitation of the electrode material can be prevented accordingly. In addition, since excessive melting of an electrode tip portion is suppressed, it is possible to prevent blackening, which is a phenomenon in which an electrode material adheres to an inner wall of a sealed body. In addition, it is possible to suppress the loss of a projection of an electrode tip portion serving as an arc origin, which is caused by excessive melting. Moreover, by alternately applying positive and negative currents at shorter periods so that a projection of an electrode tip melted in DC driving processing is stimulated in AC driving processing, the shape of the projection of the electrode tip portion can be maintained satisfactorily.

7. Circuit Configuration of Projector

Figure 11:
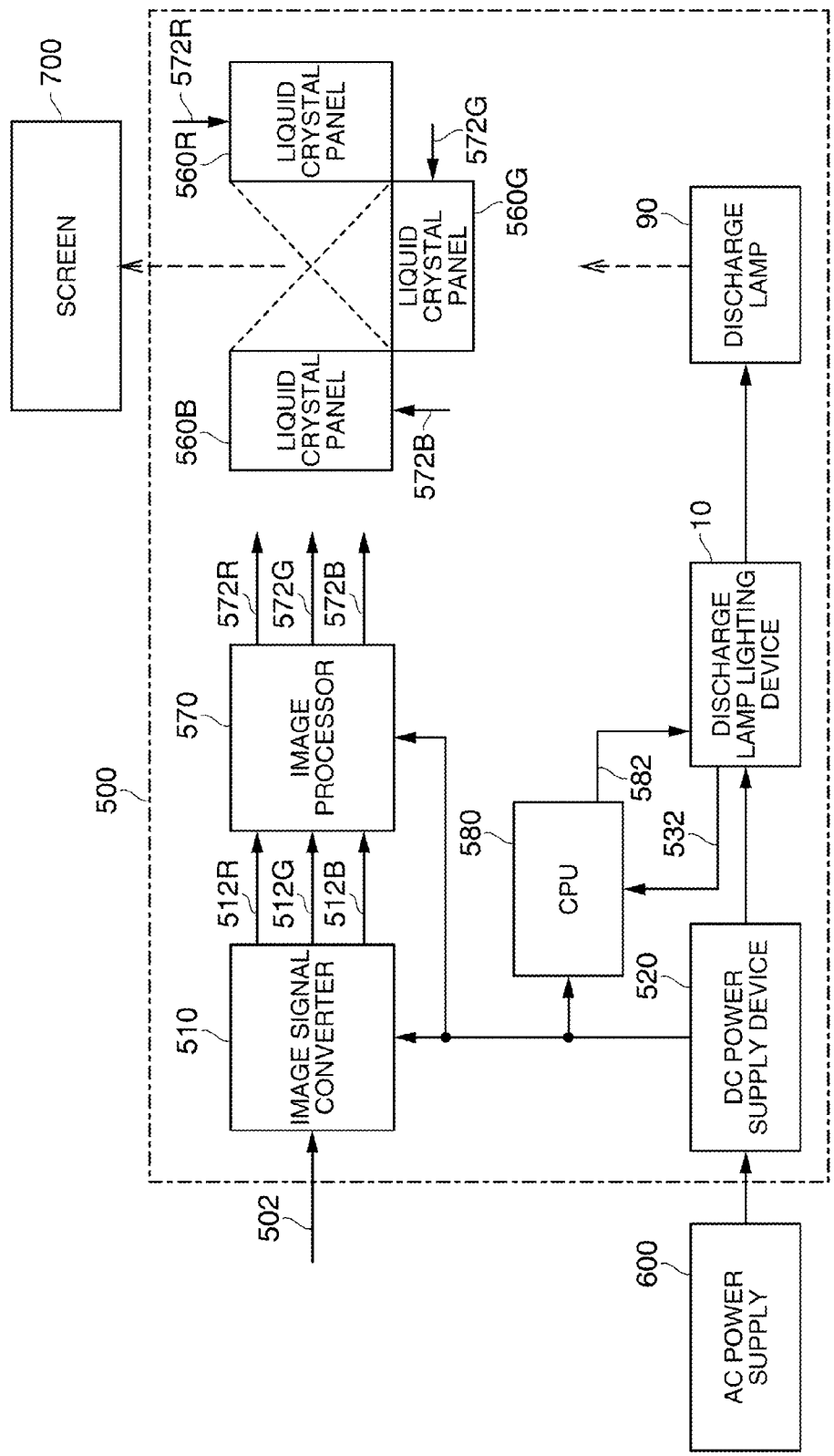
FIG. 11 is a view illustrating an example of the circuit configuration of a projector according to the present embodiment.

FIG. 11 is a view showing an example of the circuit configuration of the projector according to the present embodiment. The projector 500 includes not only the above-described optical system but also an image signal converter 510, a DC power supply device 520, the discharge lamp lighting device 10, the discharge lamp 90, the liquid crystal panels 560R, 560G, and 560B, and an image processor 570.

The image signal converter 510 generates image signals 512R, 512G, and 512B by converting an image signal 502 (for example, a brightness signal and a color difference signal or an analog RGB signal), which is input from the outside, into a digital RGB signal with a predetermined word length and then supplies the image signals 512R, 512G, and 512B to the image processor 570.

The image processor 570 performs image processing on the three image signals 512R, 512G, and 512B and outputs driving signals 572R, 572G, and 572B for driving the liquid crystal panels 560R, 560G, and 560B, respectively.

The DC power supply device 520 converts the AC voltage supplied from an external AC power supply 600 into the fixed DC voltage and then supplies the DC voltage to the image signal converter 510 located at the secondary side of a transformer (not shown but included in the DC power supply device 520), the image processor 570, and the discharge lamp lighting device 10 located at the primary side of the transformer.

At the start of the discharge lamp lighting device 10, the discharge lamp lighting device 10 generates a high voltage between electrodes of the discharge lamp 90 so that a discharge path is formed by dielectric breakdown. Then, the discharge lamp lighting device 10 supplies a driving current I for making the discharge lamp 90 keep the discharge.

The liquid crystal panels 560R, 560G, and 560B modulate the brightness of color light, which is incident on each liquid crystal panel through the optical system described previously, by the driving signals 572R, 572G, and 572B, respectively.

A CPU (Central Processing Unit) 580 controls an operation until the projector is turned off after the start of lighting in the projector. For example, a lighting command or a lights-out command may be output to the discharge lamp lighting device 10 through a communication signal 582. In addition, the CPU 580 may receive lighting information on the discharge lamp 90 from the discharge lamp lighting device 10 through a communication signal 532.

In the projector 500 configured as described above, since the formation of steady convection in the discharge lamp is further suppressed, unbalanced consumption of an electrode or unbalanced precipitation of an electrode material can be prevented.

In each of the above embodiments, the projector which uses three liquid crystal panels has been illustrated. However, the disclosure is not limited thereto and may also be applied to a projector which uses one, two, or four or more liquid crystal panels.

In each of the above embodiments, the transmissive projector has been illustrated. However, the disclosure is not limited thereto and may also be applied to a reflective projector. Here, 'transmissive' means that an electro-optical modulator as a light modulation unit is of a type in which light is transmitted therethrough like a transmissive liquid crystal panel, and 'reflective' means that an electro-optical modulator as a light modulation unit is of a type in which light is reflected therefrom like a reflective liquid crystal panel or a micromirror type modulator. As the micromirror type modulator, a DMD (digital micromirror device; trademark of Texas Instruments) may be used, for example. Also when the disclosure is applied to the reflective projector, the same effects as in the transmissive projector can be acquired.

The disclosure may be applied to both a front projection type projector, which projects a projected image from the observation side, and a rear projection type projector, which projects a projected image from the opposite side to the observation side.

In addition, the disclosure is not limited to the above-described embodiments, and various modifications may be made within the scope and spirit of the disclosure.

The disclosure includes substantially the same configuration (for example, a configuration with the same function, method, and result or a configuration with the same object and effect) as the configuration described in the embodiment. In addition, the disclosure includes a configuration which replaces a portion that is not essential in the configuration described in the embodiment. In addition, the disclosure includes a configuration capable of achieving the same operation and effect as in the configuration described in the embodiment or a configuration capable of achieving the same object. In addition, the disclosure includes a configuration in which a known technique is added to the configuration described in the embodiment.

For example, in the above embodiments, the alternating current (rectangular wave alternating current) which alternately repeats a period, for which a predetermined current value of the first polarity continues, and a period, for which a predetermined current value of the second polarity continues, was described as an example of the alternating current supplied as the driving current I. However, the alternating current supplied as the driving current I may also be an alternating current whose current value changes during a period for which the first polarity or the second polarity continues.

Moreover, for example, the length of a period for which each of the first DC driving processing, the second DC driving processing, the first AC driving processing, and the second AC driving processing is performed and time of a step or the number of steps in which the first and second frequencies change may be arbitrarily set according to the specification of the discharge lamp. In addition, it is also possible to continuously change the first and second frequencies and the length of the period for which each of the first DC driving processing, the second DC driving processing, the first AC driving processing, and the second AC driving processing is performed. In addition, time of a step or the number of steps which changes between the first and second sections may be different. Therefore, it is manifestly intended that embodiments in accordance with the present disclosure be limited only by the claims and the equivalents thereof.

What is claimed is:

1. A discharge lamp lighting device comprising:
    a discharge lamp driving section that supplies a driving current to a discharge lamp; and
    a control unit that controls the discharge lamp driving section, the control unit configured to alternately perform a first DC driving processing and a first AC driving processing in a first section of the driving current;
    alternately perform a second DC driving processing and a second AC driving processing in a second section of the driving current different from the first section;
    perform control of supplying a first direct current as the driving current in the first DC driving processing, the first direct current starting from a first polarity and having a first polarity component;
    perform control of supplying a first alternating current as the driving current in the first AC driving processing, the first alternating current repeating a first polarity component and a second polarity component;
    perform control of supplying a second direct current as the driving current in the second DC driving processing, the second direct current starting from a second polarity and having a second polarity component;
    perform control of supplying a second alternating current as the driving current in the second AC driving processing, the second alternating current repeating a first polarity component and a second polarity component; and
    temporally change a length of at least one of: (i) a period for which the first DC driving processing is performed, and (ii) a period for which the second DC driving processing is performed.

2. The discharge lamp lighting device according to claim 1, wherein the control unit repetitively increases or decreases the length of at least one of: (i) the period for which the first DC driving processing is performed, and (ii) the period for which the second DC driving processing is performed.

3. The discharge lamp lighting device according to claim 2, wherein the control unit repetitively increases or decreases in a stepwise manner the length of at least one of: (i) the period for which the first DC driving processing is performed, and (ii) the period for which the second DC driving processing is performed.

4. The discharge lamp lighting device according to claim 1, wherein the control unit temporally changes the length of at least one of: (i) a period for which the first AC driving processing is performed, and (ii) a period for which the second AC driving processing is performed.

5. The discharge lamp lighting device according to claim 1, wherein
the first alternating current begins with the first polarity component, and the first polarity component has a same polarity as the first polarity of the first direct current, and
the second alternating current begins with the first polarity component, and the first polarity component has a same polarity as the first polarity of the first direct current.

6. The discharge lamp lighting device according to claim 1, wherein the second polarity of the second direct current is opposite from the first polarity of the first direct current.

7. A projector comprising the discharge lamp lighting device according to claim 1.

8. A discharge lamp lighting device comprising:
a discharge lamp driving section that supplies a driving current to a discharge lamp; and
a control unit that controls the discharge lamp driving section, the control unit configured to alternately perform a first DC driving processing and a first AC driving processing in a first section of the driving current;
alternately perform a second DC driving processing and a second AC driving processing in a second section of the driving current different from the first section;
perform control of supplying a first direct current as the driving current in the first DC driving processing, the first direct current starting from a first polarity and having a first polarity component;
perform control of supplying a first alternating current as the driving current in the first AC driving processing, the first alternating current repeating a first polarity component and a second polarity component;
perform control of supplying a second direct current as the driving current in the second DC driving processing, the second direct current starting from a second polarity and having a second polarity component;
perform control of supplying a second alternating current as the driving current in the second AC driving processing, the second alternating current repeating a first polarity component and a second polarity component; and
temporally change a length of at least one of: (i) a period for which the first AC driving processing is performed, and (ii) a period for which the second AC driving processing is performed.

9. The discharge lamp lighting device according to claim 8, wherein the control unit repetitively increases or decreases the length of at least one of: (i) the period for which the first AC driving processing is performed, and (ii) the period for which the second AC driving processing is performed.

10. The discharge lamp lighting device according to claim 9, wherein the control unit repetitively increases or decreases in a stepwise manner the length of at least one of: (i) the period for which the first AC driving processing is performed, and (ii) the period for which the second AC driving processing is performed.

11. A projector comprising the discharge lamp lighting device according to claim 8.

12. A driving method for supplying a driving current to a discharge lamp, comprising:
alternately performing a first DC driving and a first AC driving in a first section of the driving current;
alternately performing a second DC driving and a second AC driving in a second section of the driving current different from the first section;
supplying a first direct current as the driving current in the first DC driving, the first direct current starting from a first polarity and having a first polarity component;
supplying a first alternating current as the driving current in the first AC driving, the first alternating current repeating a first polarity component and a second polarity component;
supplying a second direct current as the driving current in the second DC driving, the second direct current starting from a second polarity and having a second polarity component;
supplying a second alternating current as the driving current in the second AC driving, the second alternating current repeating a first polarity component and a second polarity component; and
temporally changing a length of at least one of: (i) a period for which the first DC driving is performed, and (ii) a period for which the second DC driving is performed.

13. A driving method for supplying a driving current to a discharge lamp, comprising:
alternately performing a first DC driving and a first AC driving in a first section of the driving current;
alternately performing a second DC driving and a second AC driving in a second section of the driving current different from the first section;
supplying a first direct current as the driving current in the first DC driving, the first direct current starting from a first polarity and having a first polarity component;
supplying a first alternating current as the driving current in the first AC driving, the first alternating current repeating a first polarity component and a second polarity component;
supplying a second direct current as the driving current in the second DC driving, the second direct current starting from a second polarity and having a second polarity component;
supplying a second alternating current as the driving current in the second AC driving the second alternating current repeating a first polarity component and a second polarity component; and
temporally changing a length of at least one of: (i) a period for which the first AC driving is performed, and (ii) a period for which the second AC driving is performed.

* * * * *